United States Patent
Cardina et al.

(10) Patent No.: US 6,411,802 B1
(45) Date of Patent: Jun. 25, 2002

(54) WIRELESS BACKUP TELEPHONE DEVICE

(75) Inventors: Donald M. Cardina, Lawrenceville; Charles M. Link, II, Roswell, both of GA (US)

(73) Assignee: BellSouth Intellectual Property Management Corporation, Atlanta, GA (US)

( * ) Notice: Subject to any disclaimer, the term of this patent is extended or adjusted under 35 U.S.C. 154(b) by 0 days.

(21) Appl. No.: 09/268,591

(22) Filed: Mar. 15, 1999

(51) Int. Cl.[7] ............................................. H04M 11/00
(52) U.S. Cl. ...................... 455/404; 455/426; 455/445; 379/33; 379/32.04; 379/2
(58) Field of Search ................................ 455/404, 426, 455/445, 557, 554; 379/3, 37, 34, 1, 2, 40, 39, 58, 59

(56) References Cited

U.S. PATENT DOCUMENTS

| | | |
|---|---|---|
| 4,658,096 A | 4/1987 | West, Jr. et al. |
| 4,734,928 A | 3/1988 | Weiner et al. |
| 4,737,975 A | 4/1988 | Shafer |
| 4,775,997 A | 10/1988 | West, Jr. et al. |
| 4,922,517 A | 5/1990 | West, Jr. et al. |
| 5,020,091 A | 5/1991 | Krolopp et al. |
| 5,185,779 A * | 2/1993 | Dop et al. ..................... 379/33 |
| 5,530,736 A | 6/1996 | Comer et al. |
| 5,546,444 A | 8/1996 | Roach, Jr. et al. |
| 5,751,789 A | 5/1998 | Farris et al. |
| 6,134,314 A * | 10/2000 | Dougherty et al. ......... 379/207 |

* cited by examiner

Primary Examiner—Thanh Cong Le
Assistant Examiner—Lana Le
(74) Attorney, Agent, or Firm—Kilpatrick Stockton LLP

(57) ABSTRACT

A wireless telephone backup device for landline telephone equipment that may be located on the customer side of the landline service connection, typically in a restricted access location, such as an attic, basement, or utility closet. An interconnection circuit in the backup device detects service interruptions in the subscriber's landline connection and, in response, powers on a wireless communication device to provide backup telephone service to the customer premises equipment. The interconnection circuit also provides the other features standard landline telephone service, including dial tone, ring voltage, and normal dialing for outgoing calls. The backup device also forwards incoming landline calls to the wireless unit in the backup device, and may send a message notifying a maintenance center of the service interruption. Further, the backup device may initiate an indicator in an alarm system at the site of the customer premises equipment to notify the subscriber of the service interruption.

29 Claims, 20 Drawing Sheets

WIRELESS BACKUP TELEPHONE DEVICE

TECHNICAL FIELD

The present invention relates generally to telecommunications systems, and relates more specifically to a device and system for providing wireless backup telephone service for landline telephone equipment.

BACKGROUND OF THE INVENTION

Telephone service in the North America is one of the most reliable communications systems in the world. The public switched telephone network (PSTN), or landline network, uses copper and fiber optic land-based telephone lines as the standard for connecting end-user telephone equipment to the network. Landline telephone equipment, known in the art as customer premises equipment (CPE), receives and sends telephone calls through the landline network. The reliability of the landline network creates a consumer expectation of trouble-free, uninterrupted telephone service. Nevertheless, landline telephone service occasionally becomes interrupted, primarily due to damage caused to overhead landlines during severe weather.

For example, landline telephone service often becomes interrupted during extreme weather events, such as hurricanes, floods, and ice storms. Because these weather events often coincide with electric power outages and very difficult traveling conditions, many subscribers, such as the elderly, immobile persons, persons caring for young children, and persons relying on home-based medical equipment may find that these extreme weather events are the most important occasions to have telephone service available. Emergency response personnel, private contractors specializing in tree removal, insurance adjusters, government officials, and utility personnel may also have an increased need to maintain telephone service during extreme weather events. Though no system can be guaranteed 100 percent reliable, these and other subscribers may be willing to pay for any gain or increase in reliability of their telephone service.

In addition, when landline telephone service becomes interrupted, a delay in the repair time may occur if the service provider is not notified as soon as possible. In some cases, the consumer may not realize that his or her telephone service has been interrupted for an extended period, and the service provider will not be able to react until the consumer notifies the service provider of the interruption. For example, if a subscriber's home telephone service becomes interrupted while the subscriber is at work, the subscriber might not learn of the interruption until returning home from work several hours later.

Moreover, the telephone network is often relied on for security systems, such as burglar alarms, fire alarms, home-based medical monitoring systems, home-arrest prisoner monitoring systems, and the like. In other words, the current landline telephone system serves as the communication infrastructure for a large part of the remote monitoring and security systems for businesses and homes by police, fire, emergency medical personnel, and private security providers. For instance, many homeowners use burglar alarms programmed to call the police or an alarm monitoring company when the alarm is triggered. These burglar alarms, in turn, use the landline telephone system to communicate the alarm notifications to the proper authorities. As a result, intentionally cutting the landline providing telephone service to the home defeats the notification feature of the alarm system.

One approach for solving the problems described above would be to issue a conventional wireless telephone to each landline subscriber. However, this approach would allow each subscriber to use both the landline equipment and the wireless telephone at the same time. This type of increase in telephone service typically involves a monthly service charge that many subscribers may be unwilling to pay. In addition, assigning a second wireless directory number for each existing landline directory number would consume a large number of directory numbers, which could deplete the number of available directory numbers in some areas. Alternatively, upgrading the telecommunications infrastructure to allow wireless telephones to use the same directory numbers as landline telephones on a large scale basis would require a significant investment in the existing telecommunications infrastructure.

Thus, there is a need for devices to increase the reliability of landline telephone service. In particular, there is a need for a device capable of backing up landline customer premises equipment during landline telephone service interruptions. There is a further need for a technically and economically feasible mechanism for backing up landline telephone service without unnecessarily depleting the supply of directory numbers or significantly increasing the existing telecommunications infrastructure.

SUMMARY OF THE INVENTION

The present invention solves the problems described above in a wireless backup device that provides emergency backup telephone service to landline telephone equipment. This backup device detects interruptions in landline telephone service and automatically provides backup telephone service to the landline telephone equipment through a wireless telephone. The backup device also notifies the telephone service provider that the landline service has been interrupted, and may also notify the homeowner that telephone service has been interrupted, for example through an indicator on an alarm panel. Because the backup device uses wireless communications, it provides backup service even when the landline system is suffering widespread outages, such as during extreme weather events. The backup device also increases the reliability of security and monitoring systems by providing an alternate communication system in cases of intentional landline telephone service interruptions.

In addition, because the backup device operates only during very infrequent landline service outages, a large number of backup devices can be supported by a relatively small number of temporary directory numbers. That is, because a particular temporary directory number can be assigned to a backup device only while that device is in operation, and then reassigned to another backup device at a later time, a large number of backup devices can be installed without severely burdening the supply of directory numbers. Similarly, because each backup device operates very infrequently, a telephone service provider can support a large number of backup devices without significantly increasing the existing telecommunications infrastructure.

The backup device also provides an additional service that telephone service providers can offer as a value-added service to their subscribers. This may be a particularly important advantage in an environment of increased competition among telephone service providers. Because this type of backup service can be implemented without depleting the supply of directory numbers or significantly increasing the existing telecommunications infrastructure, it can be offered to subscribers at a relatively low cost. For example, it is expected that this type of backup service will be offered at a fraction of the cost of full-time wireless telephone service.

Generally described, the invention is a device and system for backing up landline telephone service to customer premises equipment. The backup device detects interruptions in the landline service connection and, in response, powers on a wireless communication device. An interconnection circuit then functionally connects the customer premises equipment to receive telephone service through the wireless device. The interconnection circuit also supplies traditional landline service features to the customer premises equipment, such as dial tone and ring voltage. Once switched into connection with the customer-side of the landline, the backup device provides what appears to be normal landline voice telephone service to all of the customer premises telephone equipment. Specifically, the backup device provides all of the customer premises equipment with ring voltage for incoming telephone calls, and dial tone with normal dialing for outgoing telephone calls.

To enable incoming as well as outgoing telephone calls, the backup device automatically forwards the landline telephone service to a temporary directory number assigned to the wireless device in the backup device. Specifically, the wireless device communicates through radio channels with a mobile telephone switching office (MTSO) of a wireless communication network. Upon powering on, the wireless device automatically registers with the MTSO, obtains a temporary directory number from the MTSO, and transmits a forwarding message to forward telephone calls directed to the landline directory number to the temporary directory number. This forwarding message is then relayed to a telephone redirection device, such as a switch servicing the landline or a local number portability platform (LNPP), to implement call forwarding for the landline telephone service.

More specifically, bi-directional backup telephone service for the customer premises equipment is enabled as follows. For outgoing telephone calls, someone in the premises dials a desired directory number from the customer premises equipment. The interconnection circuit transfers the directory number from the customer premises equipment to the wireless communication device, which sends a call origination message containing the dialed directory number to the wireless network. The wireless network, in some cases in combination with the landline telephone system, then connects the outgoing telephone call to the customer premises equipment by way of the wireless device.

For incoming telephone calls, a calling party dials the subscriber's landline directory number. Somewhere in the routing of the telephone call to the landline, a telephone redirection device forwards the telephone call to the temporary directory number assigned to wireless unit in the backup device. This call forwarding feature routes the telephone call to the MTSO where the wireless unit of the backup device is registered. The MTSO then connects the telephone call to the customer premises equipment by way of the wireless device. The telephone redirection device may typically be the switch that services the landline for the customer premises equipment. Alternatively, the telephone redirection device may be an LNPP that is typically consulted by the originating service switching point (SSP) for the incoming telephone call.

The backup device also detects resumption of telephone service provided by the landline to the customer premises equipment. The interconnection circuit then disconnects the customer premises equipment from the wireless communication device, and powers down the wireless communication device. The backup device may also transmit a message instructing a telephone call redirection device to unforward telephone calls to the directory number assigned to the wireless communication device to the directory number assigned to the customer premises telephone equipment.

The backup device may be incorporated into a premises alarm system, such as a home or business alarm. In this case, the backup device detects landline interruptions to the customer premises equipment, provides backup telephone service as described above, and also provides an indication of the landline interruption through the alarm system, typically by illuminating an indicator on an alarm panel. The alarm system may also implement other types of indications, such as a distinctive dial tone, distinctive ring, announcement, and the like. In addition, the alarm system may notify others of the landline interruption, for example by placing a telephone call or sending an e-mail to the telephone service provider, the police, an alarm monitoring company, the homeowners' office telephone number, and so forth. Upon reactivation of landline service telephone service, the alarm system deactivates the landline interruption indicator, and may also notify others of the resumption of landline interruption.

Other objects, features, and advantages of the present invention will become apparent upon reading the following specification, when taken in conjunction with the drawings and the appended claims.

DETAILED DESCRIPTION OF EMBODIMENTS OF THE INVENTION

Figure 1:
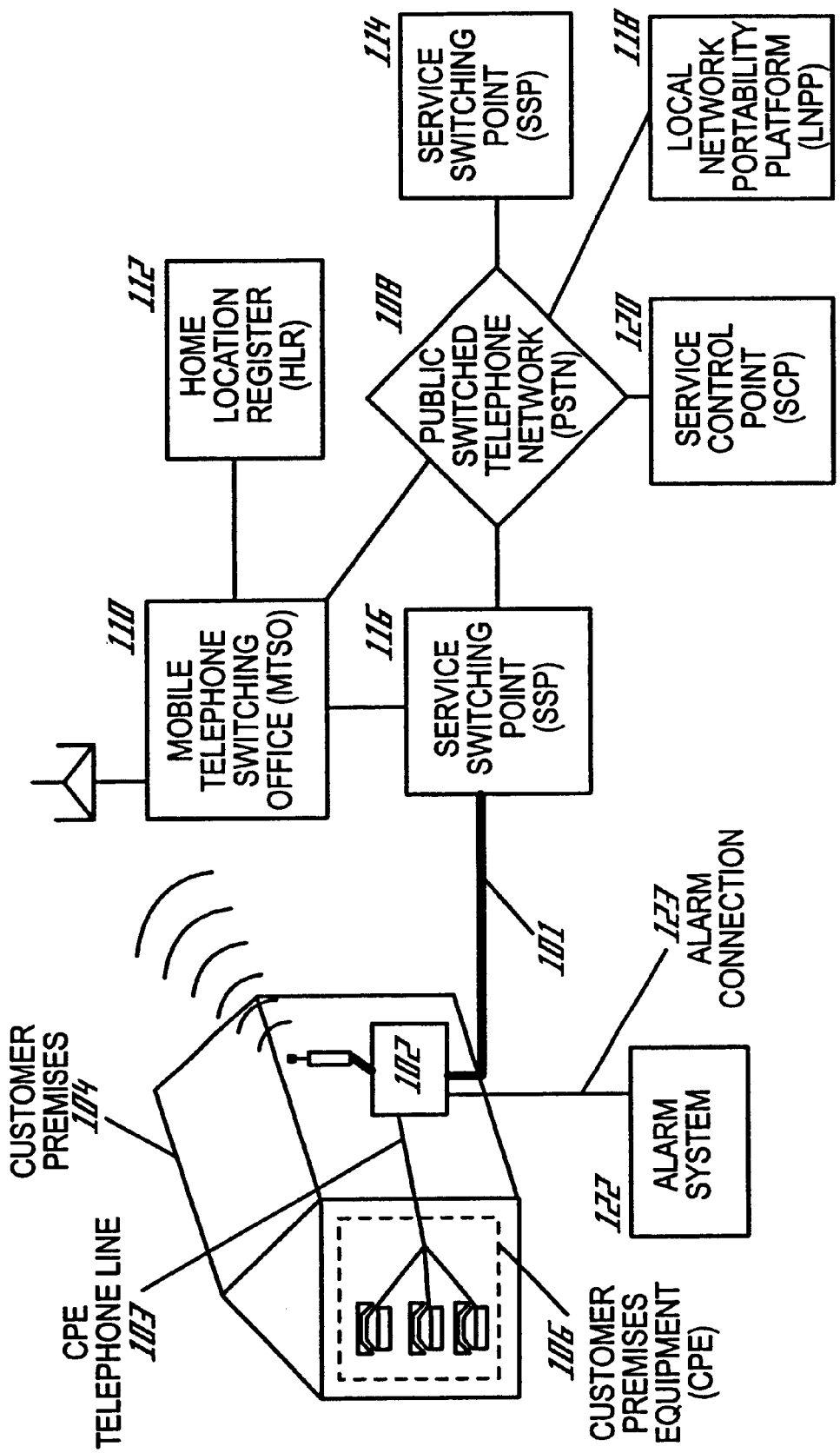
FIG. 1 illustrates the operating environment of the disclosed embodiments of the invention, specifically a backup device configured to provide emergency wireless telephone service to a customer premises telephone equipment.

The invention may be embodied in a backup device that is preferably located on the customer side of the landline service connection, typically in a restricted access location, such as an attic, basement, or utility closet. An interconnection circuit in the backup device detects service interruptions in the subscriber's landline connection and, in response, powers on a wireless communication device to provide backup telephone service to the customer premises equipment. The interconnection circuit also provides the other features of standard landline telephone service, including dial tone, ring voltage, and normal dialing for outgoing calls. The backup device also forwards incoming landline calls to the wireless unit in the backup device, and may send a message notifying a maintenance center of the service interruption. Further, the backup device may initiate an indicator in an alarm system at the site of the customer premises equipment to notify the subscriber of the service interruption.

The wireless communication network supports the backup device by receiving the forwarding message from the wireless communication device in the backup device. The wireless network then enters a forwarding record into a call redirection device to redirect calls to the directory number of the subscriber's landline connection to the wireless communication device in the backup device. The call redirection device may be the switch that services the landline for the customer premises equipment, or the call redirection device may be a local number portability platform (LNPP). The landline network forwards incoming calls to the customer premises equipment through the wireless network to the wireless communication device. Outgoing calls are connected from the customer premises equipment to the wireless communication device. The wireless device sends the outgoing calls over a radio frequency to the wireless network. The wireless network then routes the outgoing calls over the wireless and landline networks to deliver the calls to the called parties.

The present invention can be embodied in a self-contained enclosure that connects to standard telephone (e.g., RJ-11 telephone "in" and telephone "out") and electric power (e.g., 120 Volt AC) outlets with an optional connection to an alarm system (e.g., twisted pair). The wireless device within the enclosure may be implemented on circuit boards. This configuration may be advantageous because certain equipment in a standard wireless telephone is not required in the backup device, such as a multifunction keypad, LCD, earphone, ringer, and microphone. Alternatively, an off-the-shelf wireless telephone may plug into sockets within the enclosure. The enclosure is preferably locked and stored in a restricted access location to prevent inadvertent or intentional tampering. By housing the backup device in a waterproof enclosure, the backup device can easily be mounted inside or outside a customer's home. In this configuration, the backup device is a portable unit that can be easily picked up from a retail store and carried to the customer's home or office. The backup device can be easily unplugged for moving to another location.

The enclosure incorporates a conventional modular plug connection supported by the casing of the enclosure to receive conventional modular telephone jacks to connect the backup device to the telephone landline connection. That is, a customer can connect the backup device to the landline connection by simply plugging conventional RJ-11 telephone "in" and telephone "out" jacks directly into the modular plugs located on the casing of the enclosure. The enclosure also includes a conventional electrical power cord for connecting the backup device directly to a primary power supply, such as the household 120 Volt AC system.

The components of the backup device typically include a wireless communication device, an interconnection circuit, a microprocessor, and a power supply. A socket inside the enclosure holds the wireless communication device in place. The wireless device can be removed from the socket for directory number programming or for maintenance or repair. The power supply connects directly to the wireless device when the wireless device is placed directly into the socket. For example, a battery-charger combination can be used to power the wireless device by incorporating a rechargeable battery into the wireless device, connecting the wireless device to a compatible battery charger when the wireless device is in the socket, and powering the battery charger with an external household AC power supply.

The interconnection circuit functionally connects the wireless communication device into the input wires of the customer's home telephone. To supply standard landline features to the customer premises equipment during a landline service interruption, the interconnection circuit includes a voltage generator, a ring generator, and a dial tone generator. That is, the interconnection circuit creates an apparently seamless communication connection between the customer's home telephone and the wireless device of the backup device. When landline service is non-functional, if a customer picks up the landline telephone, the interconnection circuit creates a connection between the customer premises equipment telephone and the wireless device, such that the customer can use the customer premises equipment to receive incoming calls or to dial outgoing calls.

The microprocessor executes a line failure analysis routine to detect landline failure conditions. In response to a landline failure, the microprocessor activates the interconnection circuit according to the programmed line failure analysis routine in the microprocessor. The interconnection circuit controls the power supply and the wireless communication device according to the programmed line failure analysis routine in the microprocessor. The interconnection circuit utilizes conventional electrical components, detection devices, and circuitry.

A premises alarm system can also be connected to the backup device through conventional connections incorporated in the casing of the enclosure. In response to a landline failure, the backup device can send a signal to the alarm system indicating that a landline failure exists and that local landline telephone service is non-functional. The premises alarm system includes an alarm indicator signal notifying the customer that the landline is out-of-service, and the backup device has been activated.

Telecommunication service providers have already installed the telecommunication equipment to support voice links between wireless communication devices and the landline network. The landline network supports the backup device by executing a call forwarding routine in response to receiving a message from a backup device indicating that a landline failure condition exists.

When the interconnection circuit of the backup device detects a landline failure condition, the interconnection circuit powers on the wireless communication device. The wireless device sends a message to a local cellular serving switch connected to the landline network indicating that a landline failure condition exists. Upon receiving a message from the wireless device, the local cellular serving, switch receives a directory number for the wireless device. The local cellular serving switch accesses a database to correlate the directory number for the wireless device with the landline directory number of the backup device. The local cellular serving switch sets a trigger in the switch servicing the landline connection to the customer's home where the backup device is installed. The trigger contains call forwarding information to route incoming calls directed to the landline directory number to the directory number assigned to the wireless device. That is, when a calling customer dials the landline directory number, the switch servicing that landline directory number routes the call to the directory number of the wireless device.

Thus, when a caller dials the landline directory number, the landline network can handle the call even though the landline connection to that particular landline directory number is out-of-service. A call for the landline directory number received at the switch servicing the landline directory number, routes the call to the directory number of the wireless device. The local cellular serving switch receives the call, and the local serving cellular switch sends the call over a radio frequency to the wireless device. The wireless device receives the call and connects the call through the interconnection circuit of the backup device to the customer's landline telephone.

For outgoing calls from the landline directory number out-of-service, the interconnection circuit functionally connects the customer's landline telephone equipment to the wireless device. The interconnection circuit collects the dialed digits of the outgoing call and sends the complete directory number through the wireless device to the local cellular serving switch. The local cellular serving switch routes the call to the intended directory number in the landline network.

Customer premises equipment is also referred to as "terminating equipment," which can be telecommunications equipment including, but not limited to, telephones, modems, facsimile machines, computers, or wireless telephones. Specific customer premises equipment, such as a telephone, can be referred to as "customer premises telephone equipment."

The wireless communication device may include any conventional analog or digital wireless telephone or cellular radiotelephone. A suitable wireless communication device communicates with a wireless communication network functionally connected to the landline network.

In addition, a suitable wireless communication device interfaces with the customer premises equipment to permit voice and data transfer between the wireless device and the customer premises equipment. Such connections allow the wireless communication device to bypass the landline network when service is interrupted, and to link the customer premises equipment to the wireless communication network through the wireless communication device.

Conventional registration methods for a wireless communication device operating in a wireless communication network can be used to authorize, verify, and track the activities of a wireless communication device in the wireless network. Other communication methods may be used to transfer voice or signal data from the subscriber's premises to a remote location, but suitable methods can transfer the voice or signal data to a remote location in the landline network.

Any conventional power source, without limitation, can be used to power the wireless communications device. A suitable power supply provides the wireless device with immediate and compatible power when the wireless device is activated to receive or send a call on the wireless network. An example of a suitable power source is a sealed, portable lead acid battery supplying direct current to the wireless device. Other power devices can be used, including a combination of a rechargeable battery and battery charger connected to the conventional household alternating current (AC), or a direct connection from household AC to the wireless device.

Service interruption conditions disable the ability of the customer premises equipment to send outgoing or to receive incoming calls. Service interruptions can include physical severance of the connection between the PSTN and the customer's premises, or an interruption caused by the failure of an electrical system supporting the PSTN including but not limited to, loss of line current, loss of ring, loss of dial tone, and loss of line voltage.

Any type of call redirection device for redirecting telephone calls on the landline communication network can be used. Suitable call redirection devices can be embodied in a single device or in a series of devices connected together to perform the same function. Examples of call redirection devices include, but are not limited to, the following examples: a series of connected switches linked to a home location register (HLR) database to direct a telephone call from one switch to another, AN (Advanced Intelligent Network) programming of a modified local network portability platform (LNPP) database working with in conjunction with programmable switches, a local number portability platform (LNPP) linked to a local number portability (LNP) database in a service control point (SCP), or any other conventional call forwarding methods.

Any type of notification concerning the interruption of service or the activation of the wireless backup device can be communicated to the customer and the telephone service provider. Suitable examples of notifying the customer and the telephone service provider include, but are not limited to, the following examples: a visual light on the terminating equipment, a unique dial tone emitted from the terminating equipment when the telephone receiver is picked up, or a unique visual, audile, or tactile alarm relayed to the customer through an alarm panel.

Operating Environment of the Disclosed Embodiments

Referring now to the drawings, in which like numerals indicate like elements throughout the several views, FIG. 1 is a functional block diagram illustrating the operating environment of disclosed embodiments of the invention. The operating environment is specifically a conventional landline network 100 with a landline connection 101 to a wireless backup telephone device 102 located on a customer premises 104. A customer premises equipment (CPE) telephone line 103 connects the backup device 102 to customer premises equipment (CPE) 106.

The backup device 102 is generally connected to the landline connection 101 between the customer premises equipment 106 and the public switched telephone network (PSTN) 108 of the landline network 100. The backup device 102 connects to the landline network 100 so that the backup device 102 detects landline telephone service interruption conditions and monitors incoming and outgoing calls to and from the customer premises equipment 106. In this example, the backup device 102 is located at the customer premises 104, attached to the outside of the customer's home or business. The backup device 102 can be located at or remote to the customer premises 104 so long as the backup device 102 monitors and detects service interruption conditions in the customer's landline connection 101 to the landline network 100.

The backup device communicates through a radio frequency or channel with a mobile telephone switching office (MTSO) 110. The MTSO 110 interfaces with the PSTN 108 through voice-channel lines. The MTSO 110 may be one of several MTSO's comprising a wireless communication network linked to the PSTN 108. The landline connections between the MTSO 110 and the PSTN 108 facilitate communications between the wireless network and landline telephones operating in the PSTN 108. Thus, wireless communication devices operating on the wireless network can communicate with telephones operating on the landline network.

The MTSO 110 connects to a home location register (HLR) 112. The HLR 112 is a location register where user identities and other user information can be stored in and retrieved from a database of user records. Information such as directory numbers, user profiles, locations, and validation period can be stored in the HLR 112. The HLR 112 and the MTSO 110 can be located at the same site or at remote points.

A series of service switching points (SSP's) 114, 116, commonly referred to as "switches" or "SSP's", connect together in the landline network 100 and connect to the PSTN 108. SSP's 114, 116 connect to the PSTN 108 by voice-channel circuits and voice-channel lines. In the conventional landline network 100, SSP's 114, 116 handle the forwarding, switching, and routing of landline network 100 telephone calls.

Typically, a directory number, commonly referred to as a "telephone number", is assigned to each landline telephone connection serving a customer premises. Several pieces of customer premises equipment 106 can be connected to a single landline telephone connection 101, but all of the pieces of customer premises equipment linked to that single landline connection are assigned only one directory number. Multiple landline connections can be made to a customer premises, but each landline connection will have a different directory number.

A wireless communication device operating in a wireless communication network uses a directory number to identify the wireless device while the device is receiving or sending a call in the wireless network. Typically, only one directory number can be assigned to each wireless communication device while the wireless device is sending or receiving a call. Various methods to assign a directory number to a wireless communication device include, without limitation, the following: pre-assigning a directory number to the wireless device at the factory, assigning a virtual directory number or personal identification number (PIN), pre-assigning or pre-programming a mobile identification number (MIN), assigning a standard cellular directory number, or assigning a temporary directory number.

When a calling customer dials the directory number for the destination customer premises equipment 106, an originating service switching point (SSP) 116 services the calling customer's telephone landline connection. The originating service switching point (SSP) 116 determines a destination switch to forward the call to by finding a terminating service switching point (SSP) 114 servicing the destination customer's landline connection 101. A database in the SSP 114 cross-references the dialed directory number with a list of terminating service switching points (SSP) to determine the correct destination switch for the call. The SSP 114 forwards the call through the PSTN 108 to the SSP 116 servicing the destination customer's landline connection 101. The SSP 116 routes the call with the dialed directory number to the landline connection 101 servicing the receiving customer premises equipment 106 at the customer premises 104.

When more than one local telephone service provider in the same geographic area installs and maintains switching equipment required to is provide telephone service, the conventional landline network 100 will require additional systems and methods to implement local number portability (LNP). In an LNP-enabled network, the dialed directory number will not necessarily identify the correct terminating switch for the call. It is anticipated that Advanced Intelligent Network (AIN) upgrades in the conventional landline network will utilize a local number portability platform (LNPP) 118 to handle incoming calls. A series of LNPP platforms connected to a system-wide LNPP database or clearinghouse 118 will be directly linked to the PSTN 108 to implement local number portability.

The LNPP 118 will be a database or clearinghouse of ported directory numbers and routing numbers for those ported directory numbers. Any switch in the PSTN will be able to access the LNPP 118 to route telephone calls to the correct terminating switch using the routing numbers obtained from the LNPP. This will allow originating switches to route outgoing telephone calls using the most direct available communication path from the originating service switching point (SSP) to the terminating service switching point (SSP). To forward telephone service for the landline 101 in an LNP enabled network, the MTSO 110 serving the backup device 102 assigns a temporary directory number to the backup device. The MTSO 110 then enters the temporary directory number assigned to the backup device 102 as the routing number for the landline 101 in the LNPP 118.

The SCP 120 is a remotely programmable intelligent network element, capable of maintaining and updating network databases through the use of relatively powerful computers. The SCP 120 may contain a local version of the LNPP 118. In addition, the SCP 120 may be used to forward telephone service for the landline 101 in a non-LNP enabled network. Specifically, the MTSO 110 enters the temporary directory number into the SCP 120 as a forwarding directory number for the landline 101. The MTSO 110 also activates a trigger for the landline 101 at the SSP 116 that services the landline. This trigger causes the SSP 116 to hold all incoming calls directed to the landline 101, and to consult the SCP 120 for instructions. The SCP 120, in turn, instructs the SSP 116 to route the call to the temporary directory number assigned to the backup device 102. This causes the SSP 116 to route the call to the MTSO 110, which routes the call to the backup device 102. Upon reactivation of the landline 101, the MTSO 110 deactivates the trigger for the landline 101 in the SSP 116 and deletes the forwarding record for the landline in the SCP 120.

The backup device 102 also connects to an alarm system 122, which may be located the customer premises or at a remote location. An alarm connection connects the alarm system 122 to the backup device 102. The alarm system 122 alerts the home or business owner or another system monitor of the failure of landline telephone service and the existence of any landline failure conditions. The alarm system 122 may also notify others that landline telephone service has been interrupted, for example by automatically placing a telephone call or sending an e-mail to notify the police or an alarm monitoring company that an emergency situation exists.

Figure 2:
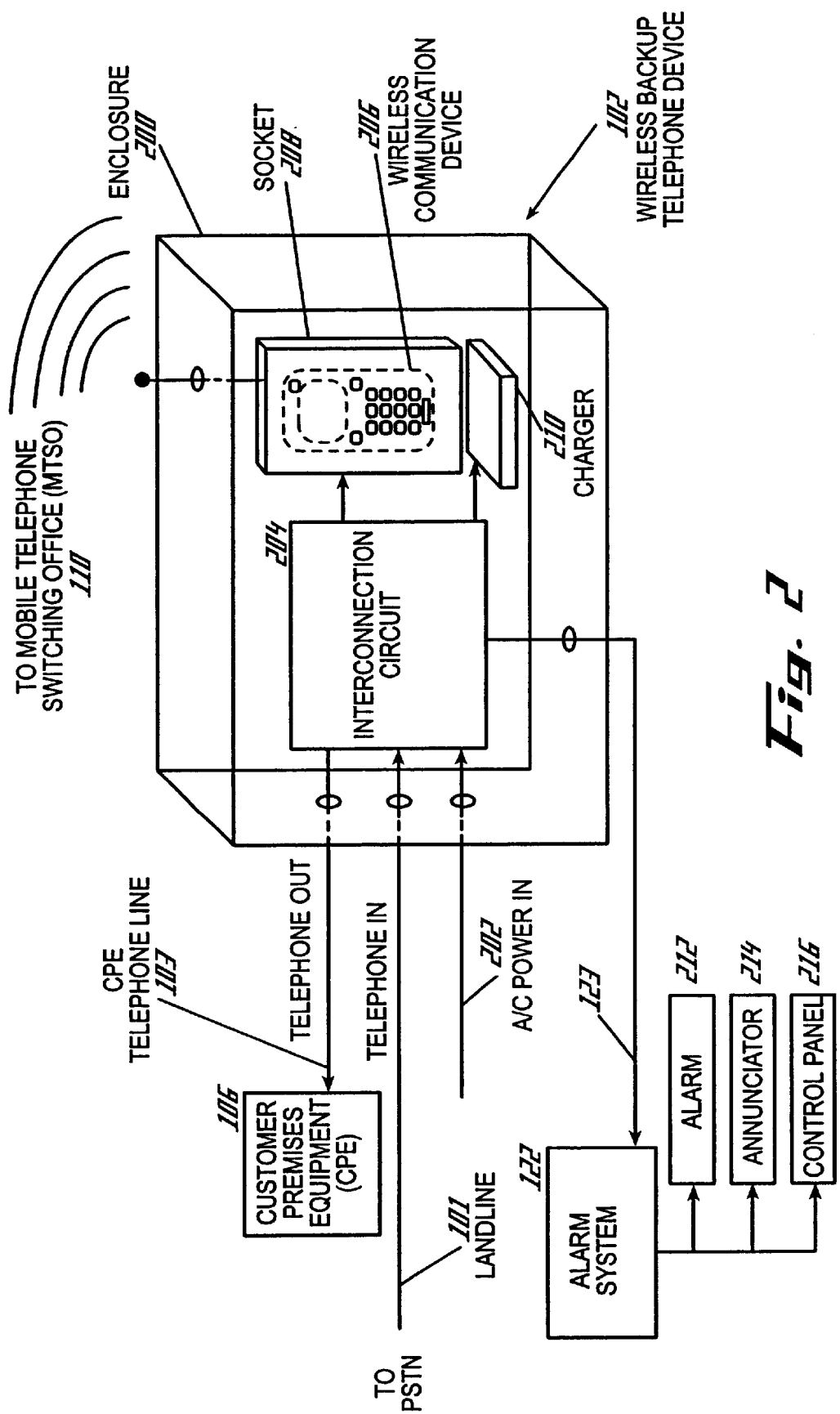
FIG. 2 is a functional block diagram of the backup device configured to provide emergency wireless telephone service to landline customer premises equipment.

In FIG. 2, a backup device 102 connects to a landline connection 101 and to customer premises equipment 106. An enclosure 200 houses the backup device 102 facilitating easy installation and connection of the backup device 102 to the landline connection 101 and to the customer premises equipment 106. For example, a telephone service provider can rapidly install the backup device 102 by attaching the enclosure to the 200 customer premises 104, and then connecting the backup device 102 to the landline connection 101, to the customer premises equipment 106, and to an a/c power line 202. The enclosure 200 housing the backup device 102 also protects the components of backup device 102 from the weather and from any intentional or inadvertent physical tampering.

Figure 4:
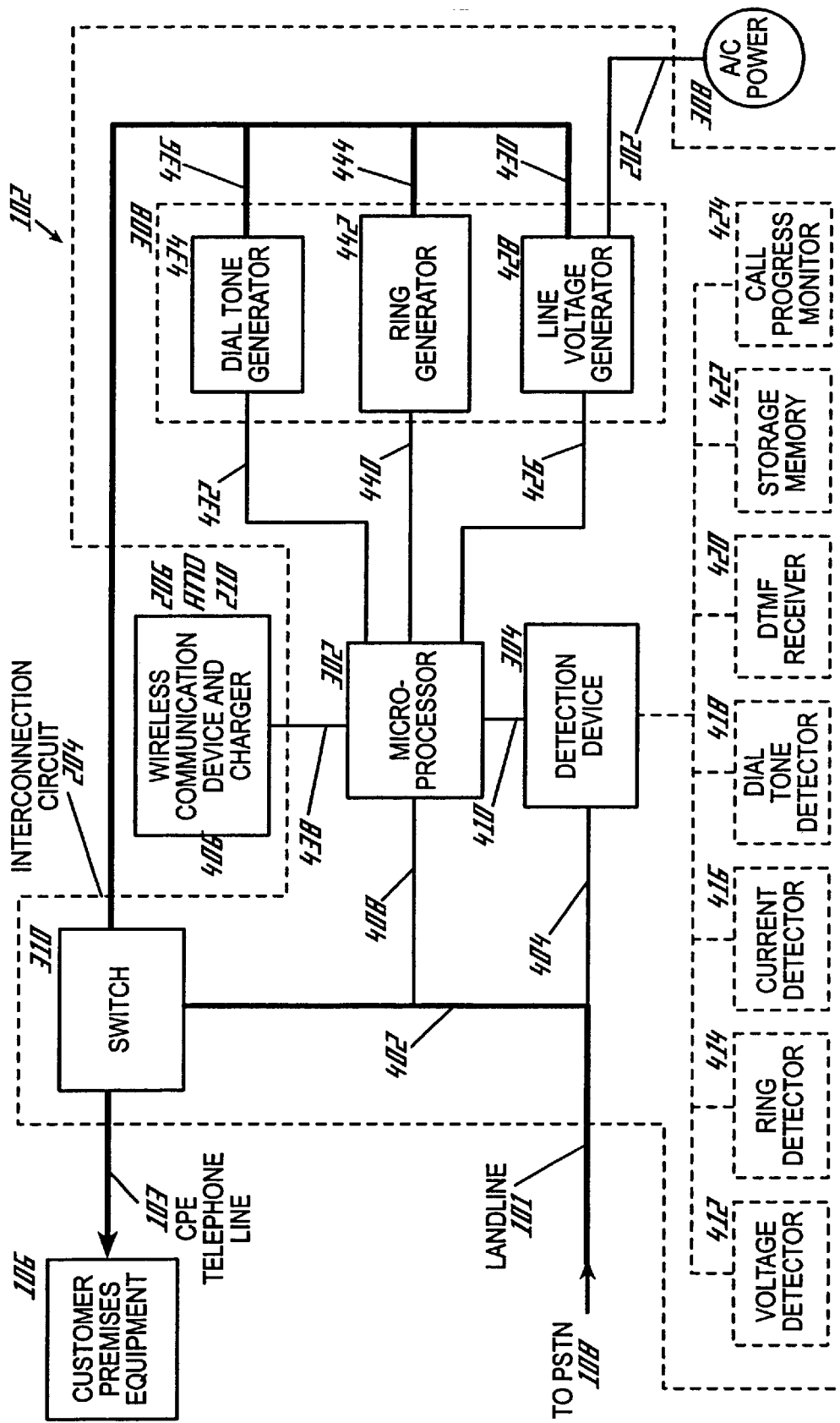
FIG. 4 is a functional block diagram of an interconnection circuit in a backup device connected to a wireless communication device.

The backup device 102 detects landline telephone service interruptions to the customer premises 104. The backup device 102 detects service interruptions using an interconnection circuit 204 that is connected to the landline connection 101 and to the customer premises equipment 106. When a service interruption does occur, the customer cannot use the customer premises equipment 106 to receive calls, to send calls, or both receive and send calls to others in the public switched telephone network 108. An example of an interconnection circuit 204 to detect failure conditions is illustrated in FIG. 4.

Upon detecting a failure condition, the backup device 102 provides wireless telephone service to the customer premises 104 for a customer attempting to receive or to send a landline call on the PSTN 108. The backup device 102 initiates wireless telephone service by powering a wireless communication device 206. The wireless device 206 attaches to an interior wall of the enclosure 200 through use of a socket 208. The socket 208 physically holds the wireless device 206 inside the enclosure 200.

An alternating current (AC) power input 202 supplies conventional household electric AC to the interconnection circuit 204. The interconnection circuit 204 controls the supply of electric current to a charger 210 connected to the interconnection circuit 204. The charger 210 is electrically and physically compatible with the wireless communication device 206 to convert the electric current to a voltage and current necessary to power the wireless device 206. The wireless device 206 operates through the supply of electrical current by the charger 210.

The wireless communication device 206 communicates with a mobile telephone switching office (MTSO) through a radio frequency. The wireless communication device 206 functionally connects to the customer premises equipment 106 through the interconnection circuit 204. Using well-known interface systems in the art, the wireless communication device 206 receives dialed directory numbers from the customer premises equipment 106, or transfers incoming wireless calls to the customer premises equipment 106. These interface systems provide a relatively seamless communication link between the customer premises equipment 106 and the wireless communication device 206.

The interconnection circuit 204 connects to an alarm system 122 located between the customer premises equipment 106 and the PSTN 108. The alarm system 122 connects to a variety of status indicators or telephone backup indication devices, including but not limited to, an alarm 212, an annunciator 214, or a control panel 216. Each of these examples is suitable for alerting the homeowner, a telephone service provider, or a maintenance center as to the existence of a service interruption condition in the landline connection 101 between the customer premises equipment 106 and PSTN 108. Activation of the backup device 102 for initiating wireless telephone service to the customer premises 104 sends an automatic notification to the telephone service provider that landline service has been interrupted.

Figure 3:
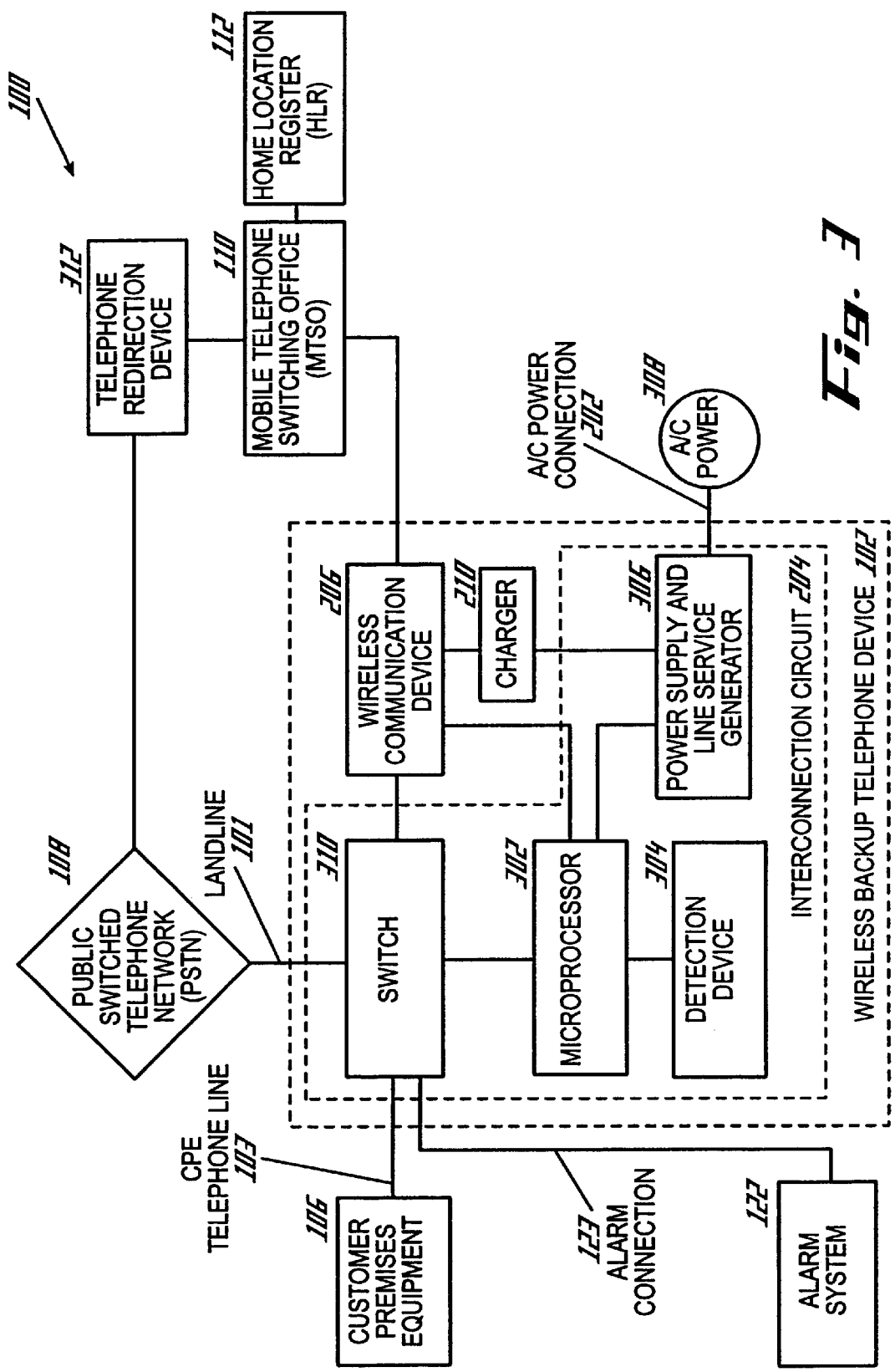
FIG. 3 is a functional block diagram with the components of a backup device in relation to elements of the public switched telephone network.

FIG. 3 is a functional block diagram illustrating the components of a backup device 102 in relation to elements of the landline network 100. As shown in FIGS. 1 and 2, the backup device 102 connects to the customer premises equipment 106, an alarm system 122, and the landline connection 101 to the PSTN 108. The microprocessor 302 of the backup device 102 executes a device routine to detect landline service interruption conditions. When a detection device 304 in the interconnection circuit 204 of the backup device 102 detects a landline service interruption, the microprocessor 302 powers on a wireless communication device 206. The wireless device 206 is powered on by turning on a power supply 306 connected to the household electrical AC 308 by an AC power connection 202. A switch 310 in the interconnection circuit 204 functionally connects the wireless device 206 to the customer premises equipment 106. The wireless device 206 sends a message through a radio frequency or channel to a mobile telephone switching office (MTSO) 110 to initiate a registration routine with the MTSO 110.

The MTSO 110 begins a subroutine to redirect telephone calls using a telephone call redirection device 312. The telephone call redirection device 312 connects between the MTSO 110 and PSTN 108. A call redirection device 312 comprises a single device or several components functionally connected to cooperate together to forward and to switch calls between the landline network 100 and the wireless network. The call redirection device 312 forwards incoming calls directed to the customer premises to the MTSO 110 serving the wireless communication device 206 at the customer premises.

Turning now to FIG. 4, a functional block diagram of an interconnection circuit 204 in a backup device 102 is shown. The interconnection circuit 204 connects to a wireless communication device 206 and charger 210, customer premises equipment 106, and a landline connection 101. The interconnection circuit 204 monitors the landline connection 101 between the customer premises equipment 106 and the landline network 100 for service interruption conditions.

A conventional landline connection 101 from a public switched telephone network (PSTN) 108 to a customer premises 104 utilizes input wires 402. Typically, two wires commonly referred to as "tip" and "ring" are used as the input wires 402. The input wires 402 are voice channel lines (shown as bold lines in FIG. 4) that connect the landline connection 101 to a switch 310. A control line 404 connects a detection device 304 of the interconnection circuit 204 to the input wires 402 between the landline connection 101 and the customer premises equipment 106. A customer premises equipment (CPE) telephone line connects the switch 310 to the customer premises equipment 106. Typically, the CPE telephone line 103 is a voice channel line.

When the backup device 102 is not activated, or when there is no landline failure condition, the switch 310 connects the landline connection 101 through the input wires 402 to the customer premises equipment 106 through the CPE telephone line 103.

When the backup device 102 is activated in response to a landline failure, the switch 310 connects the wireless communication device 206 to the customer premises equipment 106 through the CPE telephone line 103 and a voice channel line 103 between the switch 310 and the wireless device 206. A control line 408 connects the switch 310 to the microprocessor 302. The microprocessor 302 executes a line failure analysis subroutine to determine landline failure conditions, and activates the switch 310 in accordance with certain line failure conditions. A line failure analysis subroutine will be described in FIGS. 7–12 to further illustrate the functionality of the interconnection circuit 204.

A control line 410 connects the microprocessor 302 to the detection device 404. The detection device 304 connects to the landline connection 101 through the input wires 402. The detection device 304 detects and monitors service interruptions in the landline connection 101 and reconnections of landline service to the customer premises equipment 106.

The detection device 304 incorporates several pieces of detection equipment to monitor the input wires 402 from the landline connection 101, and to monitor the CPE telephone line 103 to the customer premises equipment 106 while the customer premises equipment 106 is on hook (the customer is not using the customer premises equipment 106) and off hook (the customer is using the customer premises equipment 106, attempting to place or to receive a call). For example, different pieces of detection equipment in an interconnection circuit 304 can include, without limitation, a voltage detector 412, a ring detector 414, a current detector 416, a dial tone detector 418, a dual tone multi-frequency (DTMF) receiver 420 or a dial PULSE decoder, a storage memory 422 or buffer, and a call progress monitor 424. Other similar detection equipment can be installed in the detection device 304 or the interconnection circuit 204 depending upon the specific line failure analysis to be performed on the landline connection 101 to detect or to monitor landline service interruptions, and also depending upon the line analysis to be performed on the CPE telephone line 103 connecting to the customer premises equipment 106.

The voltage detector 412 detects voltage loss in the input wires 402 from the landline connection 101. If a voltage loss is detected, the voltage detector 412 sends a signal indicating a voltage loss. The detection device 304 sends the signal through the control line 410 to the microprocessor 302 indicating a voltage loss. The microprocessor 302 activates the switch 310 through control line 408 to functionally connect the wireless device 206 with the customer premises equipment 106 through voice channel line 406.

Subsequently, the voltage detector 412 also detects when sufficient voltage is restored in the landline connection 101. In response to detecting sufficient voltage in the landline connection, the voltage detector 412 sends a signal indicating sufficient voltage. The detection device 304 sends the signal through the control line 410 to the microprocessor 302 indicating sufficient voltage. The microprocessor 302 activates the switch 310 through control line 408 to functionally connect the landline connection 101 with the customer premises equipment 106 through the input wires 402.

A ring detector 414 detects when a ring voltage has been generated on the landline connection 101. In an insufficient ring voltage has been detected, then the ring detector 414 sends a signal indicating insufficient ring voltage. The detection device 304 sends the signal through the control line 410 to the microprocessor 302 indicating a loss of ring voltage. The microprocessor 302 activates the switch 310 through control line 408 to functionally connect the wireless device 206 with the customer premises equipment 106 through voice channel line 406.

The current detector 416 detects current loss in the landline connection 101. If a current loss is detected, the current detector 416 sends a signal indicating a current loss. The detection device 304 sends the signal to the microprocessor 302 through control line 410 indicating a current loss. The microprocessor 302 activates the switch 310 through control line 408 functionally connecting the wireless device 206 with the customer premises equipment 106.

Subsequently, the current detector 416 also detects when sufficient current is restored in the landline connection 101. In response to detecting sufficient current in the landline connection, the current detector 416 sends a signal indicating sufficient current. The detection device 304 sends the signal through the control line 410 to the microprocessor 302 indicating sufficient current. The microprocessor 302 activates the switch 310 through control line 408 to functionally connect the landline connection 101 with the customer premises equipment 106 through the input wires 402.

When the wireless device 206 is connected with the customer premises equipment 106, the current detector 416 detects current in the CPE telephone line 103 connecting the customer premises equipment 106 with the wireless device 206. If the customer premises equipment 106 is off hook, the current detector 416 detects current, and the current detector 416 sends a signal indicating that the customer premises equipment 106 is off hook. The detection device 304 then sends the signal to the microprocessor 302 through control line 410 indicating that the customer premises equipment 106 is off hook.

If the customer premises equipment 106 is on hook, the current detector 416 detects no current in the CPE telephone line 103, and the current detector 416 sends a signal indicating that the customer premises equipment 106 is on hook. The detection device 304 then sends the signal to the microprocessor 302 through control line 410 indicating that the customer premises equipment 106 is on hook.

The dial tone detector 418 detects loss of dial tone in the landline connection 101. If a loss of dial tone is detected, the dial tone detector 418 sends a signal indicating a loss of dial tone. The detection device 304 then sends the signal to the microprocessor 302 through control line 410 indicating a loss of dial tone. The microprocessor 302 activates the switch 310 through control line 408, functionally connecting the wireless device 206 with the customer premises equipment 106 through voice channel line 406.

Subsequently, the dial tone detector 418 also detects when a dial tone is restored in the landline connection 101. In response to detecting a dial tone in the landline connection, the dial tone detector 418 sends a signal indicating a dial tone. The detection device 304 sends the signal through the control line 410 to the microprocessor 302 indicating a dial tone. The microprocessor 302 activates the switch 310 through control line 408 to functionally connect the landline connection 101 with the customer premises equipment 106 through the input wires 402.

The voltage generator 428 generates a voltage on through voice channel line 430 to the CPE telephone line 103 for the customer premises equipment 106. Thus, even though landline service has been interrupted, a caller from the customer premises equipment 106 will be able to pick up the phone to place or to receive a call. In general, if a caller attempts to place an outgoing call from the customer premises equipment 106 when a landline interruption exists, the current detector 416 detects current in the CPE telephone line 103 indicating the customer premises equipment 106 is off hook.

The current detector 416 sends a signal indicating that customer premises equipment 106 is off hook and a call attempt is being made. The detection device 304 sends the signal to the microprocessor 302 through control line 410 indicating that customer premises equipment 106 is off hook. The microprocessor 302 activates the switch 310 through control line 408 to functionally connect the wireless device 206 with the customer premises equipment 106 through the CPE telephone line 103 and the voice channel line 406.

Next, the microprocessor 302 sends a signal through control line 432 activating a dial tone generator 434 to generate a dial tone on the wireless device 206 through voice channel line 436 and to the CPE telephone line 103. Thus, even though landline service has been interrupted, the caller will be able to pick up the phone and hear a dial tone.

When the caller attempts to dial a directory number, the DTMF receiver 420 or dial PULSE decoder collects the dialed digits of the directory number and stores the dialed digits in the storage memory 422 or buffer until a complete directory number has been dialed. When the microprocessor 302 detects that a complete directory number has been dialed, the microprocessor 302 sends a signal through control line 438 to the wireless device 206, and the wireless device 206 places the call over a radio frequency to a mobile telephone switching office (MTSO) 110. The MTSO 110 connects the call over the landline network 100.

When the call is connected through the wireless device 206 to the landline network 100, the call progress monitor 424 monitors the status of the call. The call progress monitor 424 detects call progress signals, such as a busy signal, a ringing signal, or a dial tone. In response to detecting any of these conditions, the call progress monitor 424 sends signal through the control line 410 updating the microprocessor 302 as to the status of the outgoing call.

If an incoming call to the landline directory number is received by the landline network 100, the landline network routes the call to the MTSO 110 and sends the call over a radio frequency to the wireless device 206. When the wireless device 206 receives the call, the wireless device 206 sends a signal through the control line 438 to the microprocessor 302 indicating that an incoming call has been received. The voltage generator 428 generates a voltage through the voice channel line 430 to the CPE telephone line 103 and to the customer premises equipment 106. The microprocessor 302 sends a signal through control line 440 activating a ring generator 442. The ring generator 442 generates a ringing voltage through a voice channel line 444 to the CPE telephone line 103 to generate a ring on the customer premises equipment 106. When a customer answers the incoming call at the customer premises equipment 106, the call is connected through the CPE telephone line 103 from the wireless device 206 to the customer premises equipment 106. Thus, even when landline service has been interrupted, the customer at the customer premises equipment 106 will hear a ring and be able to pick up the phone to answer an incoming call.

In the absence of a landline failure condition, or when the landline service is restored, the switch 310 connects the landline connection 101 through the input wires 402 to the customer premises equipment 106 through the CPE telephone equipment 103. The microprocessor 302 continues to monitor the detection equipment of the detection device 304 through the control line 410 for landline interruption signals in the landline connection 101 through the control line 404.

Figure 5:
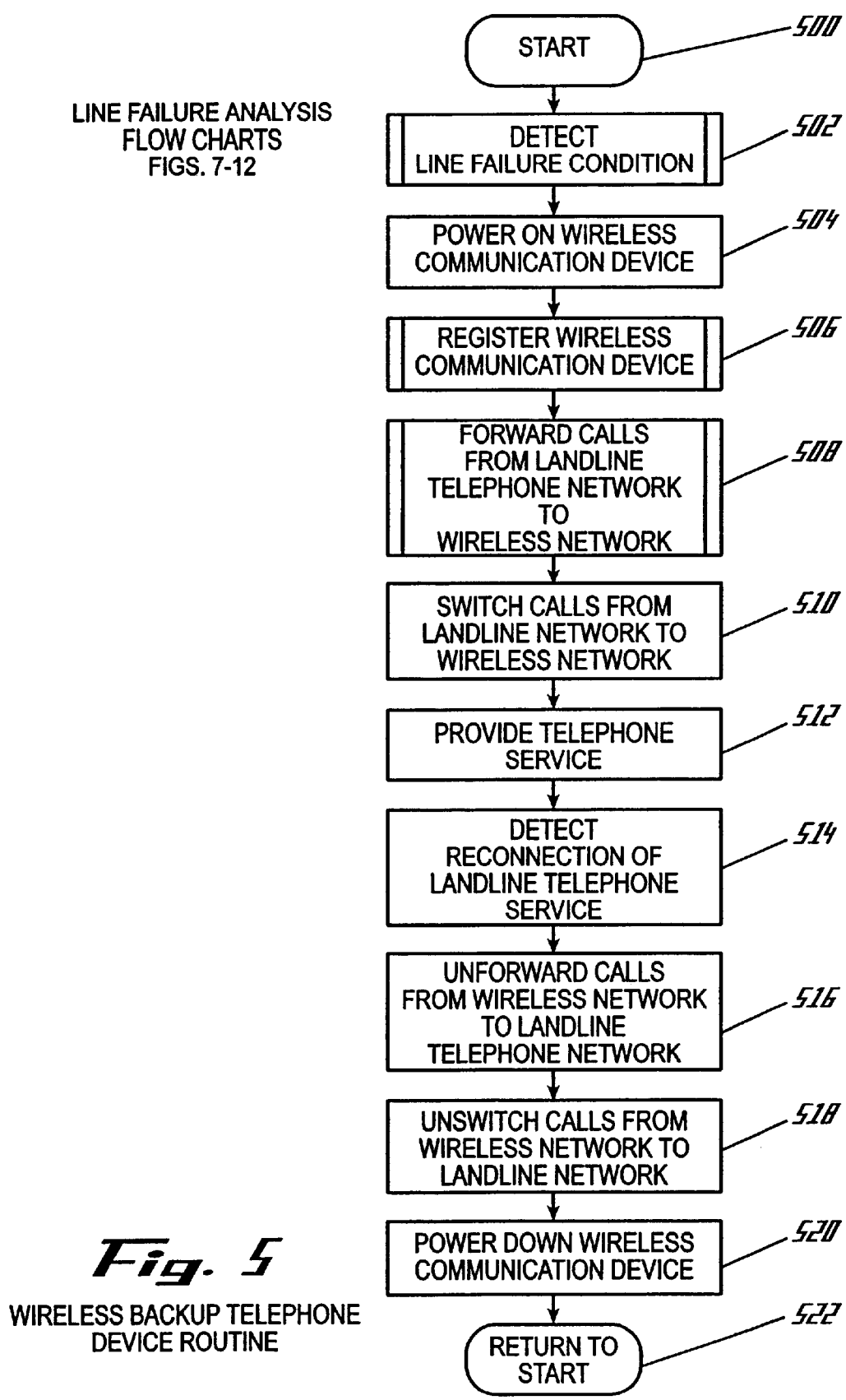
FIG. 5 is a logic flow diagram of the operation of a backup device shown in FIG. 2.

FIG. 5 illustrates a logic flow diagram of the operation of a backup device shown in FIG. 2. Prior to any landline service interruption to a customer premises 104 operating a backup device 102 in a landline network 100, the microprocessor 302 initiates a device routine at start step 500. Step 500 is followed by step 502, in which the interconnection circuit 204 initiates a line failure analysis subroutine to monitor the landline connection 101 for service interruptions. When a detection device 304 of the interconnection circuit 204 detects a failure condition in step 502, the subroutine returns to step 502 and the device routine continues in FIG. 5.

Step 502 is followed by step 504, where the microprocessor 302 of the interconnection circuit 204 of the backup device 102 responds to detection of a failure condition by powering a wireless communication device 206 in the backup device 102. After the wireless device 206 activates, the wireless device 206 begins a registration subroutine in the following step 506.

Step 504 is followed by step 506, in which the wireless communication device 206 sends a registration message to a MTSO 110. When the wireless device 206 is registered with a wireless network through the MTSO 110, the subroutine returns to step 506 and the device routine continues in FIG. 5.

Step 506 is followed by step 508, in which the landline network 100 forwards incoming calls to the customer's landline connection 101 to the wireless communication network. For example, call forwarding is accomplished by referencing the dialed directory number in a home location register (HLR) 112 located in the landline network 100. The dialed directory number is then referenced to a directory number assigned to the wireless communication device 206. Calls then dialed on the landline network 100 to the assigned directory number for the customer premises equipment 106 will be forwarded to the directory number assigned to the wireless communication device 206.

Step 508 is followed by step 510, where the landline network 100 switches an incoming call from the landline network 100 to the wireless network. For example, in a conventional landline network, the call is routed from the originating service switching point (SSP) 114 servicing the caller's telephone through the PSTN 108 to a MTSO 110 servicing the wireless communication device 206 in the wireless network.

Step 510 is followed by step 512, where the wireless communication device 206 receives an incoming call and the backup device 102 provides telephone service to the customer premises equipment 106 connected to the interrupted landline connection 101. After the customer's landline directory number is dialed on the landline network 100, the call is forwarded and switched from the originating service switching point (SSP) 114 through the PSTN 108 to the MTSO 110 servicing the wireless communication device 206. The MTSO 110 communicates to the wireless device 206 over a radio frequency or channel. The wireless device 206 receives the call from the MTSO 110, and the interconnection circuit 204 transfers the call to the customer premises equipment 106. The interconnection circuit 204 activates the ring generator 442 by switching the ring generator 442 on and off to generate a ring on the customer premises equipment 106. The customer can then use the customer premises equipment 106 to receive the incoming call.

Step 512 is followed by step 514, in which the interconnection circuit 204 detects reconnection of landline service when a landline failure condition no longer exists, or when landline telephone service is restored to the customer premises equipment 106. The backup device 102 sends a message to the MTSO 110 to unforward calls from the wireless network back to the landline network 100. For example, the MTSO 110 checks an HLR 112 database for the reference of the customer premises equipment 106 directory number in the landline network 100 to a directory number assigned to the wireless communication device 206 of the interconnection circuit 204 is activated 102. The MTSO 110 removes the reference to the wireless device 206 in the HLR 112 database in response to the unforward message from the interconnection circuit 204. Calls then dialed on the landline network 100 to the assigned directory number for the customer premises equipment 106 will not be forwarded to the directory number assigned to the wireless communication device 206, but instead will be forwarded to the terminating service switching point (SSP) 116 originally servicing the assigned landline connection 101 directory number.

Step 516 is followed by step 518, in which the MTSO 110 unswitches the calls from the wireless network back to the landline network 100. Calls made to the assigned directory number are no longer routed to the MTSO 110 servicing the wireless communication device 206 of the backup device 102, but instead calls are routed back to the terminating service switching point (SSP) 116 originally servicing the directory number.

Step 518 is followed by step 520, where the interconnection circuit 204 powers down the wireless communication device 206. The interconnection circuit 204 then restores telephone service to the customer premises equipment 106 through the landline connection, so that calls can be made to and from the customer using the directory number assigned to the customer's landline connection 101.

Step 520 is followed by step 522, in which the end of the routine returns to the start step 500. The return step 522 permits the backup device 102 to constantly monitor the landline connection 101 between the customer premises equipment 106 and the PSTN 108.

Figure 6:
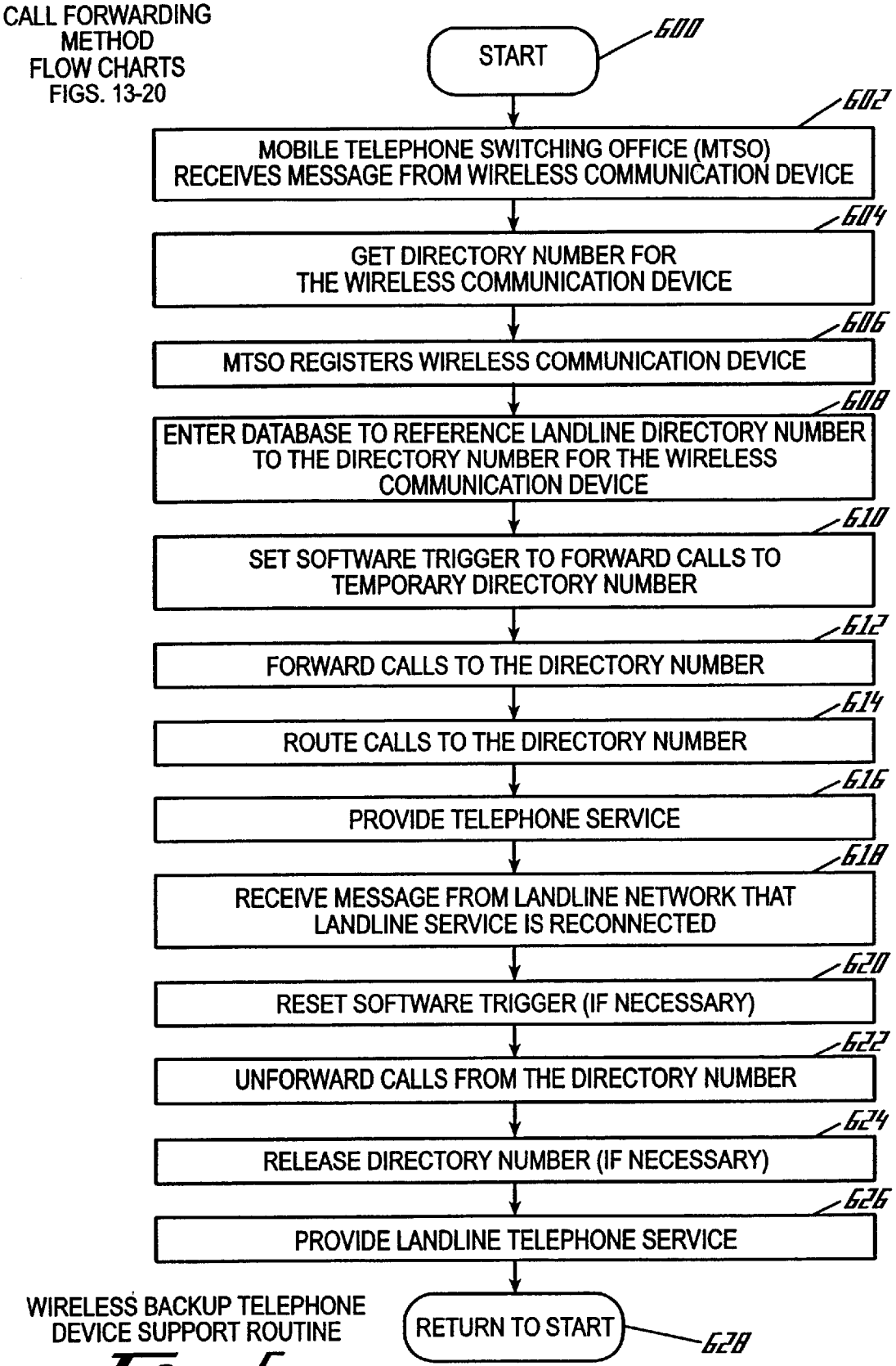
FIG. 6 is a logic flow diagram of the operation of the telephone system connected to a backup device.

FIG. 6 shows a logic block diagram of a routine executed by a conventional landline network 100 (as shown in FIG. 1) to support a backup device 102 (as shown in FIG. 2). Other landline network configurations can be used to support the backup device 102. FIGS. 13–20 show logic block diagrams describing other methods used to support a backup device 102 in modified landline network configurations.

Start step 600 initiates the support routine for a backup device 102. To operate in a landline communication network 100, the backup device 102 communicates with the landline network 100 through a radio frequency or channel with a mobile telephone switching office (MTSO) 110. The landline network 100 performs a support routine in response to the activation of backup device 102.

Step 600 is followed by step 602, in which a MTSO 110 receives a message from a wireless communication device 206 in a backup device 102 through a radio frequency. The message can contain customer location information, the directory number of the customer premises equipment 106, and the directory number of the wireless communication device 206.

Step 602 is followed by step 604, in which the MTSO 110 retrieves a directory number for the wireless device 206. Typically, the message sent by the wireless device 206 contains a directory number for the wireless device 206. If a directory number for the wireless device 206 is not contained in the message, the MTSO 110 obtains a directory number assigned to the wireless device 206. The MTSO 110 uses the directory number of the wireless device 206 to identify the activated backup device 102 and a directory number for the customer premises equipment 106. The MTSO 110 uses the directory number for the customer premises equipment 106 to identify the customer premises 104 experiencing the landline service interruption.

Step 604 is followed by step 606, in which the MTSO 110 registers the wireless communications device 206 with a wireless communications network connected to the landline network 100. Systems and methods for registration of a wireless communications device 206 with a wireless communication network are well known to those skilled in the art. Typically, a successful registration authenticates and authorizes a wireless device 206 to communicate in a wireless network. When a successful registration is complete and the wireless communication device 206 is operational, the support routine continues at step 608.

Following step 606 in step 608, the MTSO 110 references a database of directory numbers. Typically, the database will be contained in a home location register (HLR) 112 or can be located at a remote location to the HLR 112. The MTSO 110 looks up the directory number of the wireless device 206 and references the directory number of the customer premises equipment 106.

The MTSO 110 can set a database flag for the directory number of the customer premises equipment 106 designating that location as out-of-service (OOS). By tracking directory numbers in a database, the MTSO 110 can replace the directory number of the customer premises equipment 106 with the directory number of the wireless device 206. Replacement of the directory number can be temporary, or can be a permanent assignment of the directory number to the wireless device 206.

Step 608 is followed by step 610, in which the MTSO 110 sets a software trigger to forward calls to the directory number of the wireless communication device 206. Typically, the MTSO 110 sets the software trigger in a terminating service switching point (SSP) 116 servicing the customer's landline connection 101. The software trigger activates when an incoming call to the customer premises equipment 106 reaches the terminating service switching point (SSP) 116.

In modified landline network configurations, a software trigger may not be required to forward calls to the directory number of the wireless device. In these configurations, the MTSO 110 executes a call forwarding subroutine depending upon the type of call redirection device 306 utilized by the modified landline network.

Step 610 is followed by step 612, where the software trigger at the terminating service switching point (SSP) 116 forwards incoming calls to the directory number assigned to the wireless communication device 206 when an incoming call to the customer premises equipment 106 arrives at the terminating service switching point (SSP) 116. The software trigger at the terminating service switching point (SSP) 116 responds to calls made in the landline network 100 or the wireless network, and responds to all calls directed to the directory number of the customer premises equipment 106. The landline network 100 executes a call forwarding subroutine depending upon the type of call redirection device 306 utilized by the landline network 100. FIGS. 13–20 show logic block diagrams describing other call forwarding subroutines used to support a backup device 102 in modified landline network configurations.

Step 612 is followed by step 614, in which a switch 116 routes the incoming call from the landline network 100 to the wireless communication network. In a conventional landline network 100, an incoming call reaches a terminating service switching point (SSP) 116 servicing a customer's landline connection 101. The terminating service switching point (SSP) 116 sends the incoming call back through the PSTN 108 to the MTSO 110 servicing the wireless communication device 206 of the backup device 102.

Step 614 is followed by step 616, in which the MTSO 110 establishes telephone service to the customer premises 104 through the backup device 102. Typically, the MTSO 110 transmits the incoming call over a radio frequency to the wireless communication device 206. The wireless device 206 receives the incoming call from the MTSO 110, and the interconnection circuit 204 of the backup device 102 connects the call from the wireless device 206 to the customer premises equipment 106.

The customer premises equipment 106 receives incoming voice and data input, while it transfers outgoing voice and data output from the customer premises equipment 106 to the wireless device 206. The wireless device 206 transmits the output by a radio frequency to the MTSO 110. The MTSO 110 forwards the output through the PSTN 108 and to the calling customer premises equipment. Telephone service provided by the backup device 102 can be terminated after the call is completed, or service can be provided for a longer duration up to, and including the time when landline telephone service is reestablished.

Step 616 is followed by step 618, in which the MTSO 110 receives a message from the landline network 100 that landline service has been reconnected to the customer premises 104. Typically, when the interconnection circuit 204 in the backup device 102 no longer detects a failure condition in the landline connection 101 to the customer premises is 104, the backup device 102 sends a message to the MTSO 110 that landline service has been reconnected. In the alternative, the local telephone service provider or an authorized remote landline network element, such as a telephone service provider's central office (CO), sends a message to the MTSO 110 that landline service is reconnected, and the MTSO 110 receives the message. In either case, the customer's wireless telephone service provided by the backup device 102 deactivates in the following steps.

Step 618 is followed by step 620, in which the MTSO 110 resets the software trigger at the terminating service switching point (SSP) 116. When the software trigger is reset, the terminating service switching point (SSP) 116 receives incoming calls to the directory number assigned to the customer premises equipment 106, and the software trigger does not activate call forwarding of the incoming call. The terminating service switching point (SSP) 116 treats the incoming call as a normal call to the directory number assigned to the customer's landline connection 101.

Step 620 is followed by step 622, in which the MTSO 110 unforwards calls from the wireless communication network back to the landline network 100. The database flag initially set by the MTSO 110 is removed from the database, and the reference to the directory number of the wireless communication device 206 set by the MTSO 110 is removed from the database. Thus, the terminating service switching point (SSP) 116 routes incoming calls to the directory number of the customer premises equipment 106 through the customer's landline connection 101.

Step 622 is followed by step 624, in which the database releases any directory number temporarily assigned to the wireless communication device 206 if the MTSO 110 retrieved a temporary directory number in step 604. Release of the temporary directory number permits re-use of the directory number in the North American Numbering Plan (NANP), and reduces the threat of directory number depletion. If the directory number assigned to the wireless device 206 is not a temporary number, then the directory number will not be released for re-use in step 624.

Step 624 is followed by step 626, where the landline communications network 100 provides landline telephone service to the customer's landline connection 101. Normal landline telephone service is re-established between the landline network 100 and the customer premises equipment 106 through the landline connection 101 to the customer premises 104.

Step 626 is followed by step 628, in which the support routine returns to the start step 600 awaiting re-initiation of the routine by an interruption in landline telephone service to the customer premises 104.

Landline Failure Analysis

FIGS. 7–12 are logic flow diagrams of a subroutine to detect landline service interruptions using an interconnection circuit 204 (shown in FIG. 4) in a backup device 102 (shown in FIG. 2). The subroutine can be programmed into a microprocessor 302 or an attached storage or memory device connected to the interconnection circuit 204. An example of the subroutine begins at the start block 700 in FIG. 7.

Start block 700 is followed decision block 702, in which a line voltage detector 412 in the interconnection circuit 204 checks the voltage across the input wires 402 to detect whether sufficient voltage differential exists across the input wires 402 while the customer premises equipment 106 is on hook.

If the voltage detector 412 detects no voltage across the input wires 402, then the "NO" branch is followed to step 704. In step 704, the voltage detector 412 sends a signal to a microprocessor 302 indicating that a service interruption exists. The microprocessor 302 initiates a subroutine "WTBL PROCESS 1" beginning at step 800 in FIG. 8.

Returning to decision block 702, if the voltage detector 412 detects a voltage differential across the input wires 402 equal to or greater than 12 volts, then the "YES" branch is followed to decision block 706

At decision block 706, a current detector 416 measures the loop current in the CPE telephone line 103 indicating whether the customer premises equipment 106 is off hook. If the current detector 416 detects no loop current, then the customer premises equipment 106 is on hook indicating that no outgoing calls are in progress. The current detector 416 sends a signal to the microprocessor 302 indicating the customer premises equipment 106 is on hook, and the "NO" branch is followed to the start block 700 beginning the line failure subroutine again.

If the current detector 416 does detect sufficient loop current, then the customer premises equipment 106 is off hook indicating that an outgoing call may be in progress. In this case, the current detector 416 sends a signal to the microprocessor 302 indicating the customer premises equipment 106 is off hook, and the "YES" branch is followed to decision block 708.

At decision block 708, a dial tone detector 416 determines whether a dial tone is being sent on the input wires 402. The detection device 304 increases the strength of any dial tone signal being sent on the input wires 402. Amplification techniques and circuitry used to amplify a dial tone signal are well-known in the art. If the dial tone detector 416 does not detect a dial tone, the dial tone detector 416 sends a signal to the microprocessor 302 indicating that no dial tone is present and a service interruption has occurred, and the "NO" branch is followed to step 710. In step 710, the microprocessor 302 initiates a subroutine "WBTL PROCESS 2" beginning at step 900 in FIG. 9.

Returning to decision block 708, if the dial tone detector 416 detects a dial tone, then the customer premises equipment 106 is still off hook and a customer may be attempting to dial a call. In this case, the "YES" branch is followed to step 712. At step 712, the microprocessor 302 initiates a delay on a timer in the microprocessor 302 to wait for the customer to complete the attempted call. The timer can be set for a delay or a select amount of time to allow the customer to dial a directory number.

Step 712 is followed by step 714, in which the current detector 416 checks whether the customer premises equipment 106 is off hook. As described previously, the current detector 416 detects the presence of loop current in the CPE telephone line 103. If the current detector 416 detects loop current in the CPE telephone line 103 indicating the customer premises equipment 106 is still off hook and a call is still in progress, then the "YES" branch is followed back up to step 712. This loop is repeated until the call is completed and the customer premises equipment 106 is on hook.

Returning to decision block 714, if the current detector 416 detects no loop current indicating the call is complete, then the "NO" branch is followed to the beginning of the line failure subroutine at step 702. The current detector 416 sends a signal to the microprocessor 302 indicating that the call is complete, and the microprocessor 302 begins the line failure analysis subroutine from step 702.

Figure 7:
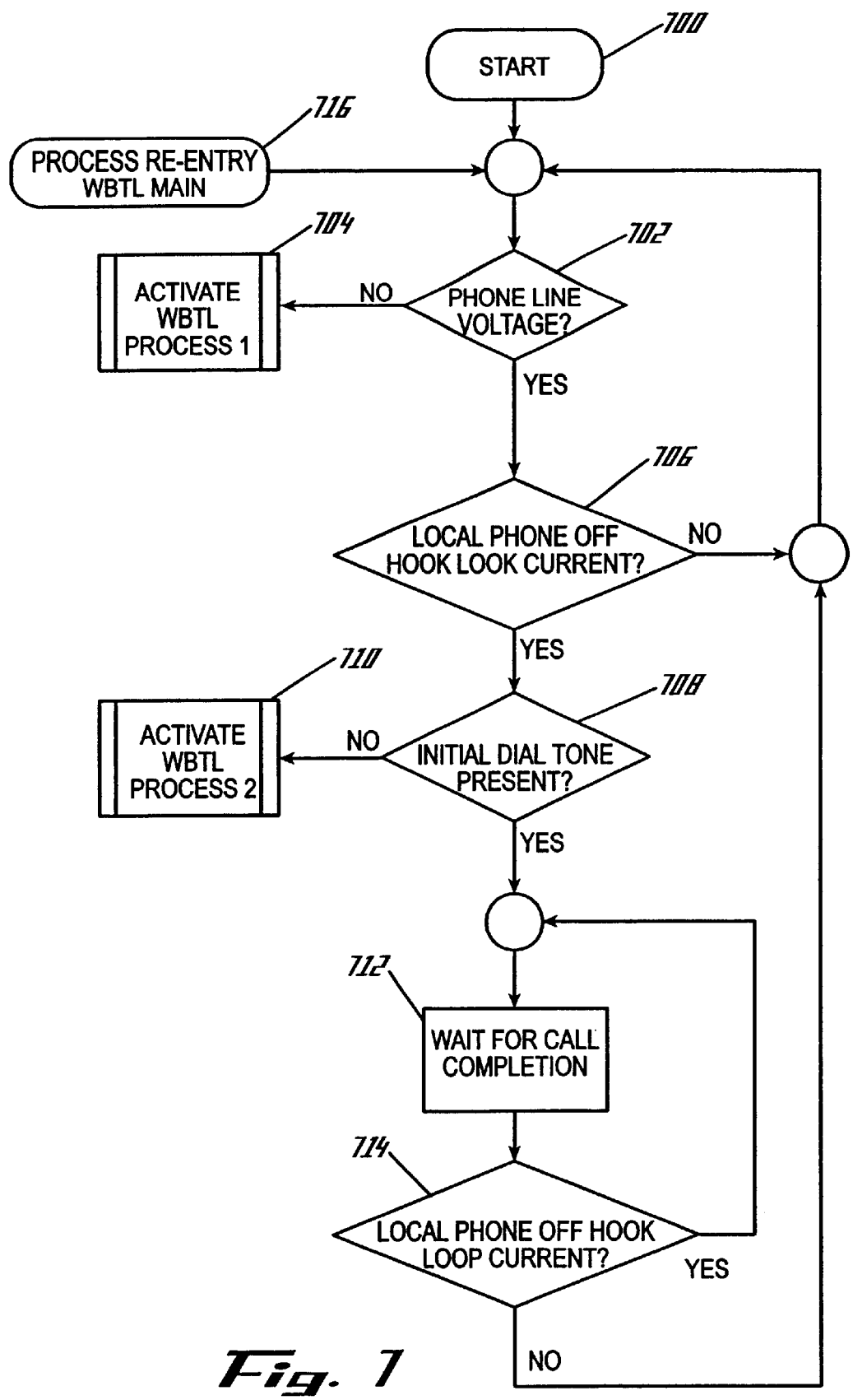
FIG. 7 is a logic flow diagram of a first type of failure analysis subroutine for the backup device shown in FIG. 2.
Figure 8:
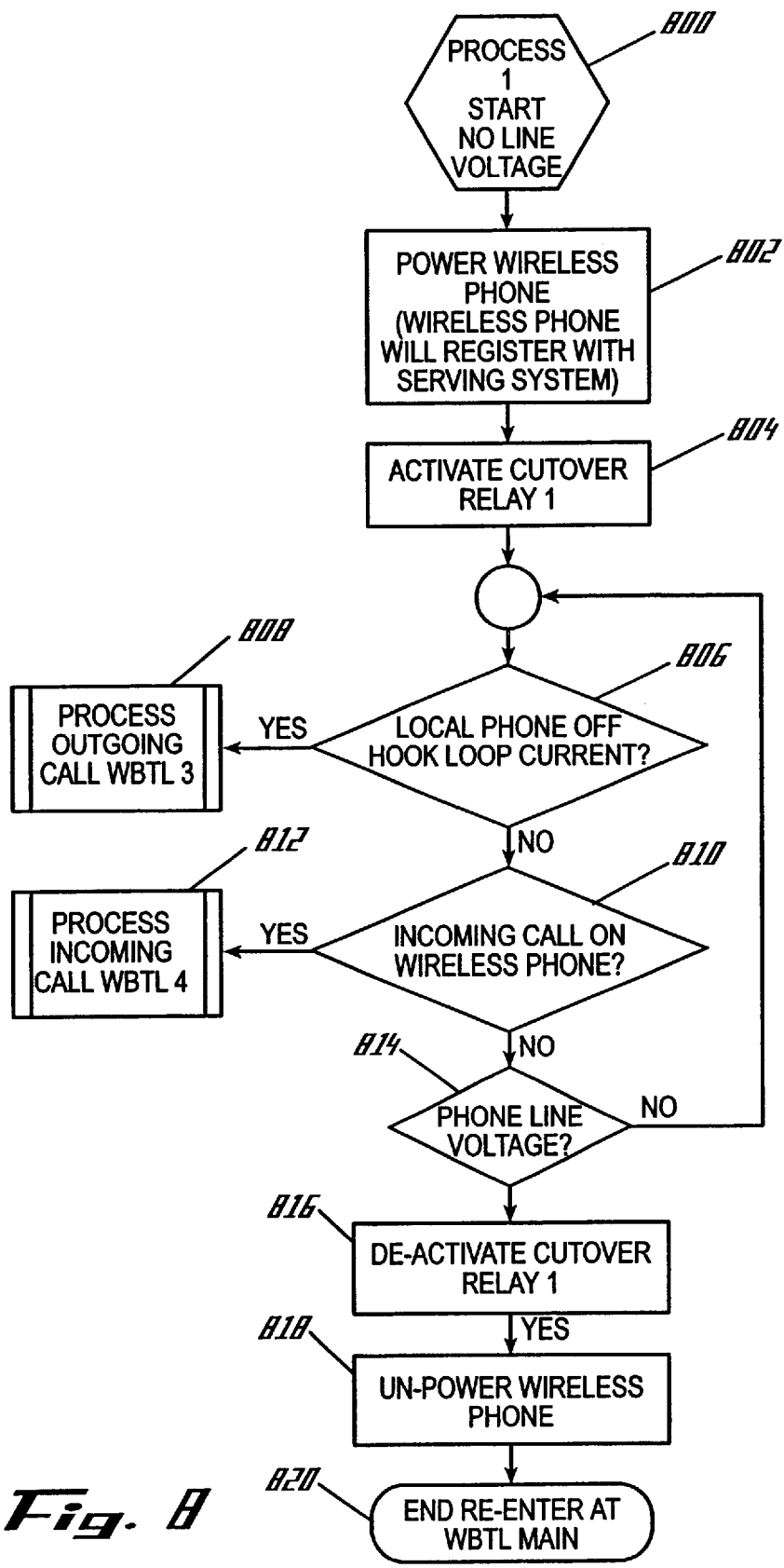
FIG. 8 is a logic flow diagram of a second type of failure analysis subroutine for the backup device shown in FIG. 2.

FIG. 8 is a logic flow diagram illustrating the steps performed when a voltage failure has occurred, that is, the voltage detector 412 does not detect line voltage in the input wires 402. A voltage failure typically occurs when the landline connection 101 between the customer premises equipment 106 and the PSTN 108 is physically cut. When the interconnection circuit 204 detects a voltage loss in the input wires 402, the interconnection circuit 204 initiates subroutine "WBTL PROCESS 1", the voltage failure subroutine, in step 704 of FIG. 7. Step 704 is followed by step 800 in FIG. 8, beginning the voltage failure subroutine.

Step 800 is followed by step 802, in which the interconnection circuit 204 activates the wireless communication device 206. The interconnection circuit 204 activates the power supply 208 to provide power to the wireless device 206. The wireless device 206 then registers with a wireless communication network, authorizing the wireless device 206 to communicate in the wireless network.

Step 802 is followed by step 804, in which the interconnection circuit 204 activates the switch 310. The switch 310 connects the customer premises equipment 106 to the wireless device 206 through the CPE telephone line 103. The microprocessor 302 activates the voltage generator 428 to provide voltage to the CPE telephone line 103.

Following step 804 is decision block 806, in which the current detector 416 determines whether the customer premises equipment 106 is off hook indicating an outgoing call attempt. If the current detector 416 detects loop current, then the customer premises equipment 106 is off hook, and the "YES" branch is followed to step 808. In step 808, the microprocessor 302 initiates subroutine "Process Outgoing Call WBTL 3" to place an outgoing call on the wireless device 206.

Returning to decision block 806, if the current detector 416 detects no loop current, indicating the customer premises equipment 106 is on hook, then the "NO" branch is followed to decision block 810. At decision block 810, the interconnection circuit 204 determines whether an incoming call has been made to the wireless communication device 206. If the microprocessor 302 detects the receipt of an incoming call on the wireless communication device 206, then the "YES" branch is followed to Step 812 to subroutine "Process Incoming Call WBTL 4" processing the incoming call. Step 812 is followed by step 1200 in FIG. 12 beginning the subroutine.

If the wireless communication device 206 does not receive an incoming call, then the "NO" branch is followed to decision block 814. At decision block 814, a voltage detector 412 determines whether voltage exists across the input wires 402. If no voltage is detected indicating that the a landline connection 101 voltage failure still exists, then the "NO" branch is followed back to decision block 806. Steps 806 and 810 will repeat if the voltage failure continues and no incoming calls on the wireless communication device 206 are detected by the microprocessor 302.

Returning to decision block 814, if the voltage detector 412 detects voltage across the input wires 402, then the "YES" branch is followed to step 816. At step 816, the interconnection circuit 204 deactivates the wireless device 206 by activating the switch 310 to reconnect the customer premises equipment 106 to the input wires 402. This disconnects the wireless device 206 from the customer premises equipment 106. If the wireless device 206 is a digital wireless device, the wireless device 206 sends a de-registration message to the wireless network. If the wireless device 206 is an analog wireless device, the wireless device 206 powers down without having to send a de-register message to the wireless network.

Step 816 is followed by step 818, in which the interconnection circuit 204 deactivates the wireless device 206. Following step 818, the end step 820 of the subroutine returns the line failure analysis subroutine to the "Process Re-entry WBTL MAIN" in step 716 of FIG. 7.

Figure 9:
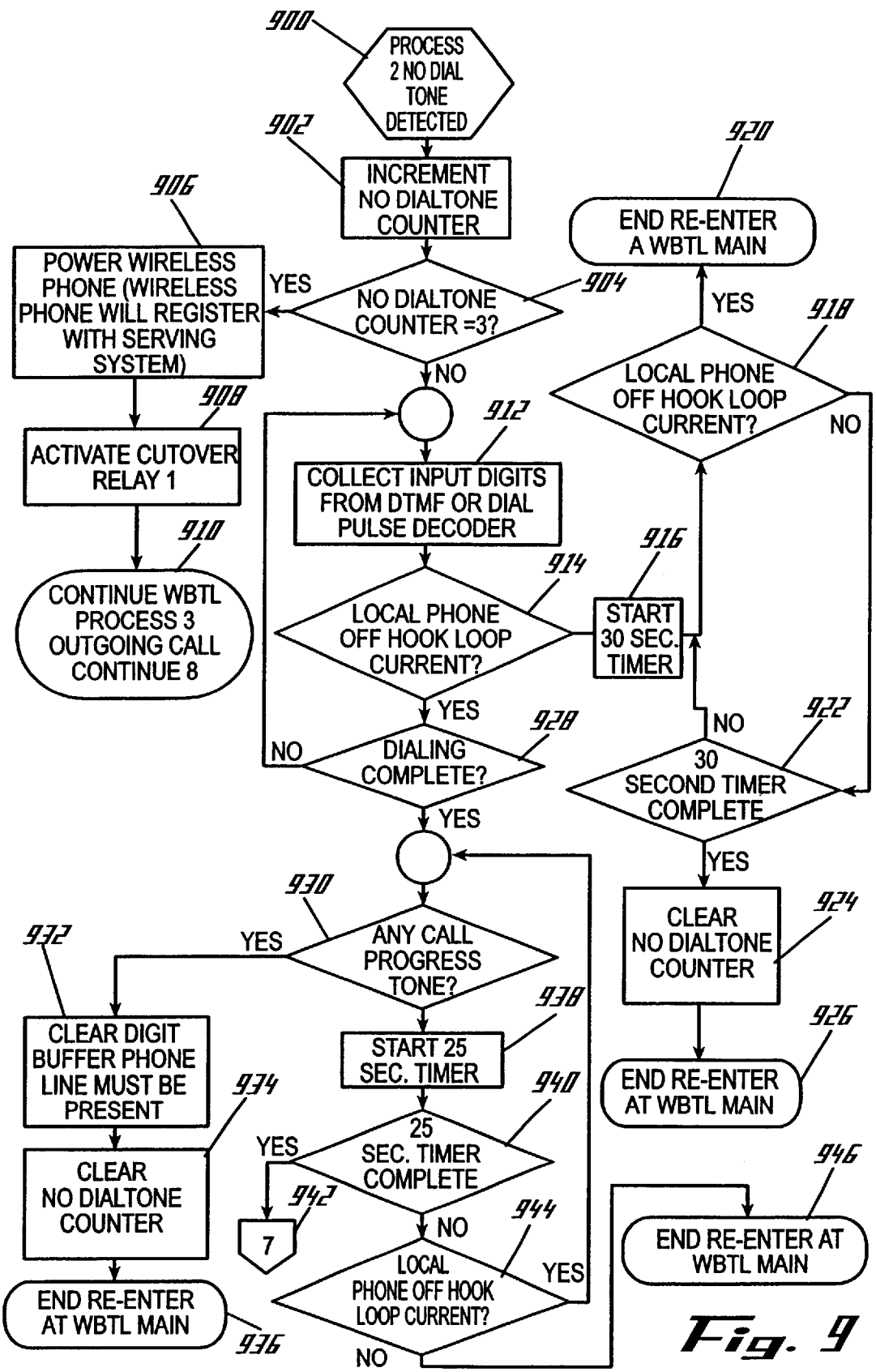
FIG. 9 is a logic flow diagram of a third type of failure analysis subroutine for the backup device shown in FIG. 2.

FIG. 9 is a logic flow diagram illustrating the steps performed when a terminating service switching point (SSP) 116 malfunction occurs, that is, the dial tone detector 418 does not detect a dial tone in the input wires 402 from the landline connection 101. When no dial tone is detected, the microprocessor 302 initiates subroutine "WBTL PROCESS 2" in step 710 of FIG. 7. Step 710 is followed by step 900 in FIG. 9 beginning the subroutine.

Step 900 is followed by step 902, in which the microprocessor 302 increments a NO_DIALTONE counter located in the microprocessor 302 by a single increment when no dial tone is detected. That is, after the customer premises equipment 106 is taken off hook, and the customer premises equipment 106 is hung up without a directory number having been dialed, the NO_DIALTONE counter will be incremented by a value of 1.

Step 902 is followed by decision block 904, in which the microprocessor 302 tests the NO$_{13}$DIALTONE counter for a value of 3. If the NO_DIALTONE counter has reached a value of 3 indicating that the customer premises equipment 106 has been taken off hook three times, and after each time the dial tone detector 418 detected no dial tone, then the "YES" branch is followed to step 906.

At step 906, the microprocessor 302 sends a signal to the interconnection circuit 204 to activate the wireless communication device 206. A power supply 208 connected to the wireless device 206 provides power to the wireless device 206. The wireless communication device 206 then registers with a wireless network. The wireless network then authorizes the wireless device 206 to communicate in the wireless network.

Step 906 is followed to step 908, where the interconnection circuit 204 activates the switch 310 connecting the wireless device 206 to the customer premises equipment 106. The microprocessor 304 activates the voltage generator 428 to generate a voltage on the CPE telephone line is 103, permitting the customer premises equipment 106 to be used for an outgoing call.

Step 908 is followed by step 910, in which the microprocessor 302 begins a subroutine "WBTL PROCESS 3" when an outgoing call is in progress and no dial tone has been detected. The subroutine "WBTL PROCESS 3" begins in step 1100 of FIG. 11.

Returning to decision block 904, in some cases a caller takes the customer premises equipment 106 off hook and does not listen for a dial tone before dialing, or an automatic dial function on a premises alarm system 122 dials without listening for a dial tone. For these instances, the value of the NO_DIALTONE counter will not reach 3, and the "NO" branch is followed to step 912.

At step 912, if a caller is dialing digits on the customer premises equipment 106, then a dual tone multi-frequency receiver (DTMF) 418 or a dial PULSE decoder collects the input digits from the customer premises equipment 106, and stores the digits in an attached storage memory 422 or dialed digit buffer.

Step 912 is followed by decision block 914, in which the current detector 416 determines whether the customer premises equipment 106 is off hook; i.e. the caller is still attempting a call. If the current detector 416 does not detect a loop current in the CPE telephone line 103 indicating that the customer premises equipment 106 is on hook and the caller has hung up the customer premises equipment 106, then the "NO" branch is followed to step 916.

At step 916, the microprocessor 302 starts a 30-second internal timer in the microprocessor 302 to allow the caller another opportunity to pick up the customer premises equipment 106 to attempt a call, after initially hanging up the customer premises equipment 106. This would be the case when the caller is indecisive in dialing a call after picking up the customer premises equipment 106 and not hearing a dial tone.

Step 916 is followed by decision block 918, in which the current detector 416 determines whether the customer premises equipment 106 is off hook; i.e. the caller is attempting a call again. If the caller picked up the customer premises equipment 106 and did not hear a dial tone the first time, hung up the customer premises equipment 106, and picks up the customer premises equipment 106 a second time, the current detector 416 detects the second call attempt. When the current detector 416 detects loop current in the CPE telephone line 103 indicating the customer premises equipment 106 is off hook and the caller is attempting another call, then the "YES" branch is followed to step 920. At step 920, the microprocessor 302 returns to the line failure analysis subroutine at "Re-entry Process WBTL MAIN" in step 716 of FIG. 7.

Returning to decision block 918, if the current detector 416 does not detect loop current in the CPE telephone line 103 indicating that the customer premises equipment 106 is on hook and caller has hung up, then the "NO" branch is followed to decision block 922.

In decision block 922, the microprocessor 302 determines whether the 30-second internal timer has expired. If the timer has not expired, then the "NO" branch is followed back to step 918 to determine whether the customer premises equipment 106 is still on hook indicating that the caller has not picked up the phone 106 a second time to attempt a call. This loop repeats until the 30-second timer has expired or until the customer premises equipment 106 is off hook indicating that the caller is attempting to dial a call.

Returning to decision block 922, if the microprocessor 302 determines that the 30-second internal timer has expired, then the "YES" branch is followed to step 924. At step 924, the microprocessor 302 clears the NO_DIALTONE counter, and resets the value equal to 0.

Step 924 is followed by step 926, in which the subroutine returns to begin the line failure analysis subroutine at "Process Re-entry WBTL MAIN" at step 716 in FIG. 7.

Returning to decision block 914, if the current detector 416 detects loop current in the CPE telephone line 103 indicating the customer premises equipment 106 is off hook a first time, the "YES" branch is followed to decision block 928. In decision block 928, the DTMF receiver 418 or dial PULSE decoder determines whether a complete directory number has been dialed on the customer premises equipment 106. A storage memory 422 or storage device attached to the DTMF receiver 418 or dial PULSE decoder stores the dialed digits. If the microprocessor 302 determines that the storage memory 422 does not contain a complete dialed directory number, then the "NO" branch is followed back to step 912 to allow the DTMF receiver 418 or dial PULSE decoder to continue collecting input digits. This loop continues until the customer premises equipment 106 is on hook indicating the caller has hung up, or until a complete directory number has been dialed.

Returning to decision block 928, if the microprocessor 302 determines that the storage memory 422 contains a complete dialed directory number, then the "YES" branch is followed to decision block 930. In decision block 930, a call progress monitor 424 determines whether there are any call progress signals on the input wires 402 indicating that the dialed directory number is being connected through the landline network 100. Examples of call progress signals include, but are not limited to, detecting whether a dial tone is being transmitted indicating end of call, or whether a busy signal is being transmitted indicating no connection, or whether a ringing signal is being transmitted indicating that the call has not yet been connected.

If the call progress monitor 424 detects that the call was successfully connected, then the "YES" branch is followed to step 932. In step 932, the microprocessor 302 clears the storage memory 422.

Step 932 is followed by step 934, in which the microprocessor 302 clears the NO_DIALTONE counter, setting the value to zero. Step 934 is followed by step 936, where the line failure analysis subroutine begins again at "Process Re-entry WBTL MAIN" at step 716 in FIG. 7.

Returning to decision block 930, if the call progress monitor 424 does not detect any call progress signals on the input wires 402 indicating that no call has been successfully connected, then the "NO" branch is followed to step 938. In step 938, the microprocessor 302 begins a 25-second internal timer located in the microprocessor 302 to allow the dialed call to be connected through the landline network 100. The duration of time set for the timer can be any amount of time necessary to wait for the call to be connected through the landline network 100.

Following step 938 in decision block 940, the microprocessor 302 checks whether the 25-second internal timer has expired. If the timer has expired, then the "YES" branch is followed to step 942. Step 942 is followed by step 1000 in FIG. 10.

Figure 10:
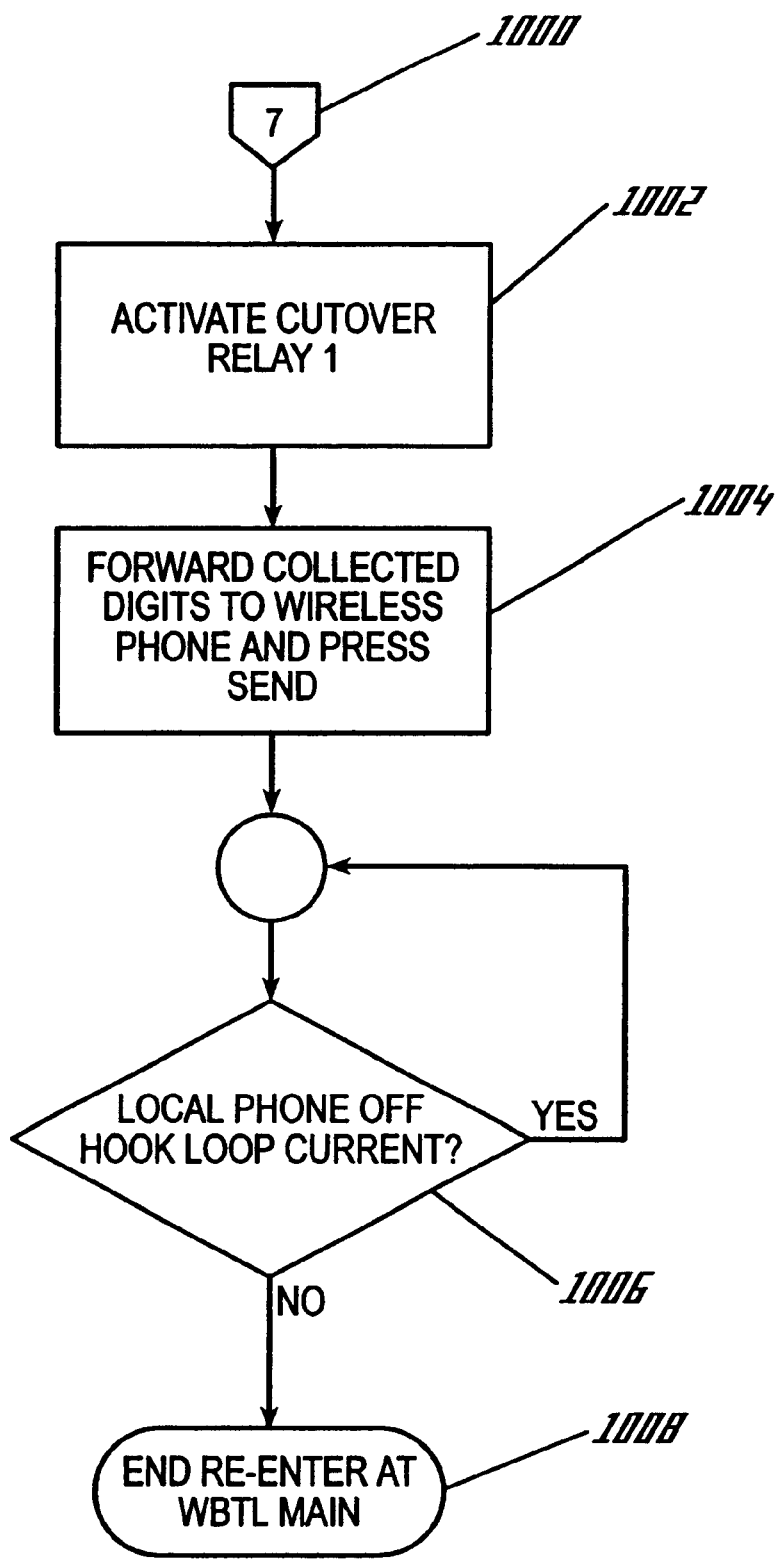
FIG. 10 is a logic flow diagram of a fourth type of failure analysis subroutine for the backup device shown in FIG. 2.

Turning now to FIG. 10, the subroutine continues in step 1000. Step 1000 is followed by step 1002, in which the microprocessor 302 activates switch 310. The switch 310 connects the wireless device 206 with the customer premises equipment 106. The microprocessor activates the voltage generator 428 to provide a voltage on the CPE telephone line 103.

Step 1000 is followed by step 1002, in which the DTMF receiver 418 or dial PULSE decoder forwards the collected dialed digits through the input wires 402 to the wireless communication device 206. The wireless communication device 206 initiates a call on the wireless network by transmitting the dialed digits by a radio frequency to a mobile telephone switching office (MTSO) 110 shown in FIG. 1.

Step 1002 is followed by step 1004, in which the current detector 416 detects whether the customer premises equipment 106 is off hook. If the current detector 416 detects loop current in the CPE telephone line 103 indicating the customer premises equipment 106 is still off hook and a call is still being attempted, then the "YES" branch is followed to repeat step 1006 again.

When the current detector 416 detects no loop current indicating the customer premises equipment 106 is on hook and the call has been terminated or completed, then the "NO" branch is followed to step 1008. At step 1008, the microprocessor 302 returns to the line failure analysis subroutine "Process Re-entry WBTL MAIN" at step 716 in FIG. 7.

Returning to decision block 938 in FIG. 9, if the 25-second internal timer has not expired, then the "NO" branch is followed to step 944. In step 944, the current detector 416 detects loop current in the CPE telephone line 103 indicating whether the customer premises equipment 106 is off hook and a call is being attempted.

If loop current is detected, then the "YES" branch is followed to step 930. At step 930, the call progress monitor 424 detects call progress signals at the customer premises equipment 106 indicating whether a call is in progress. This loop continues until either call progress signals are detected by the call progress monitor 424 or the 25-second timer expires.

Returning to decision block 944, if the current detector 416 does not detect loop current in the input wires 402, then the "NO" branch is followed to step 946 returning to the line failure analysis subroutine at "Process Re-entry WTBL MAIN" in step 716 of FIG. 7.

Figure 11:
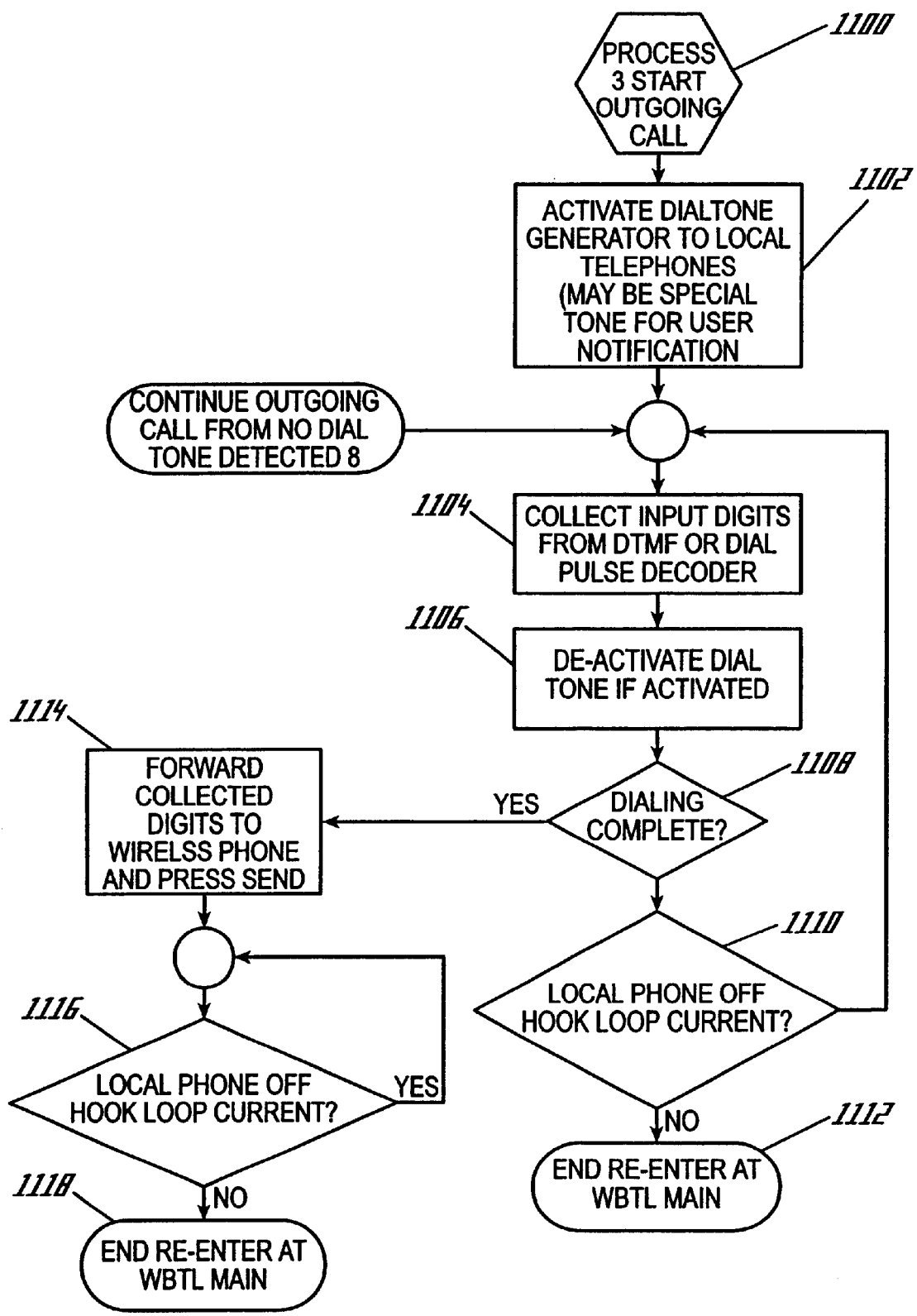
FIG. 11 is a logic flow diagram of a fifth type of failure analysis subroutine for the backup device shown in FIG. 2.

FIG. 11 is a logic flow diagram illustrating the steps of initiating an outgoing call from the backup device 102. Subroutine "WBTL PROCESS 3" begins at the start block 1100. Step 1100 is followed by step 1102, in which a dial tone generator 434 creates a dial tone for the customer premises equipment 106. To generate dial tone, the interconnection circuit 204 activates the dial tone generator 434 and a dial tone is generated through the CPE telephone line 103 to the customer premises equipment 106. Different dial tones can be generated to indicate different landline failure conditions.

Step 1102 is followed by step 1104, in which the DTMF receiver 418 or dial PULSE decoder collects input digits dialed from the customer premises equipment 106. The storage memory 422 stores the dialed digits.

Step 1104 is followed by step 1106, in which the interconnection circuit 204 deactivates the dial tone generator 434 if a digit has been entered. From the caller's perspective, the customer premises equipment 106 emits a dial tone as if normal landline service is being supplied and when a digit is dialed into the customer premises equipment 106 by the caller, the dial tone ceases to be heard by the caller.

Following step 1106 in decision block 1108, the microprocessor 302 determines whether dialing is complete by detecting whether a complete directory number has been input into the customer premises equipment 106. If a complete directory number has not been input, then the "NO" branch is followed to decision block 1110.

In decision block 1110, a current detector 416 detects whether sufficient loop current exists in the CPE telephone line 103, i.e. The customer premises equipment 106 is off the hook. If loop current is not detected indicating the customer premises equipment 106 is on hook, then step 1110 is followed by step 1112. Step 1112 returns to the line failure analysis subroutine at step 716 "Re-enter Process WBTL MAIN" in FIG. 7.

Returning to decision block 1110, if current detector 416 detects loop current in the CPE telephone line 103 indicating the caller has not finished dialing a complete directory number, then the "YES" branch is followed to step 1104. In step 1104, the storage memory 422 continues to collect input digits from the DTMF receiver 418 or dial PULSE decoder. This loop repeats until a complete directory number is dialed or until the current detector 416 detects no loop indicating the customer premises equipment 106 is on hook.

Returning to decision block 1108, if the microprocessor 302 determines that a complete directory number has been dialed, then the "YES" branch is followed to step 1114. In step 1114, the storage memory 422 forwards the collected digits to the wireless communication device 206. The wireless communication device 206 transmits the collected digits to the wireless network initiating a call using the dialed directory number.

Step 1114 is followed by decision block 1116, in which the current detector 416 determines whether loop current exists in the CPE telephone line 103 indicating the customer premises equipment 106 is off hook. If the current detector 416 detects loop current indicating the customer premises equipment 106 is off hook, then the "YES" branch is followed back to repeat the query at decision block 1116 until no loop current is detected in the input wires 402.

When the current detector 416 detects no loop current indicating the customer premises equipment 106 is on hook and the call is complete, then the "NO" branch is followed to step 1118. Step 1118 returns to line failure analysis subroutine at step 716 "Re-enter Process WBTL MAIN" in FIG. 7.

Figure 12:
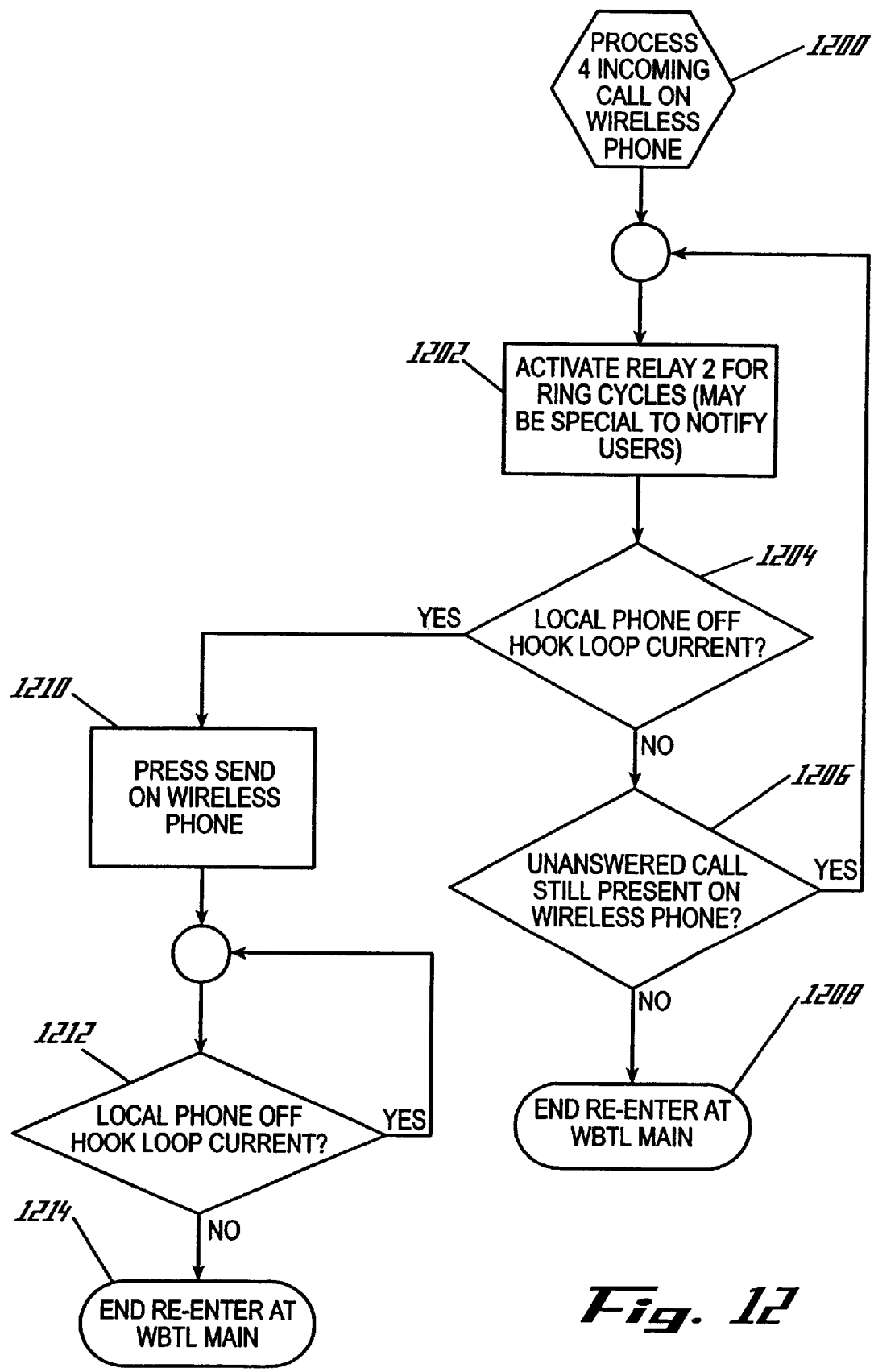
FIG. 12 is a logic flow diagram of a sixth type of failure analysis subroutine for the backup device shown in FIG. 2.

FIG. 12 illustrates subroutine "WBTL PROCESS 4", the steps to receive an incoming call on the backup device 102. The start step at 1200 initiates the subroutine. Step 1200 is followed by step 1202, in which the interconnection circuit 204 activates a ring generator 442. The ring generator 442 generates a ringing voltage on the CPE telephone line 103 to create an audible ring sound on the customer premises equipment 106, if ring equipment is available, indicating that an incoming call has arrived. Different ring cycles may be activated depending upon the line failure condition detected by the interconnection circuit 204. A typical ring cycle used to indicate an incoming call is two seconds on and four seconds off, that is, the interconnection circuit 204 supplies voltage to the ring generator 442 for two seconds and cuts voltage for four seconds.

Step 1202 is followed by decision block 1204, in which the current detector 416 determines whether loop current is present the CPE telephone line 103 indicating whether the incoming call has been answered. If the current detector 416 detects no loop current indicating the customer premises equipment 106 is on hook and the call remains unanswered, then the "NO" branch is followed to decision block 1206.

In decision block 1206, the microprocessor 302 checks the wireless communication device 206 to determine whether the incoming call is still on line. If the call is not on line indicating the caller has hung up, then the NO" branch is followed to step 1208 re-entering the line failure analysis subroutine at "Re-entry Process WBTL MAIN" step 716 in FIG. 7.

Returning to decision block 1206, if the call is still on line indicating the caller has not hung up, then the "YES" branch is followed from decision block 1206 back to step 1202. In step 1202, the interconnection circuit 204 activates the ring generator 442. This loop is continued until the current detector 416 detects loop current in the CPE telephone line 103 indicating the call has been answered, or until no call is detected on the wireless communication device 206 indicating the caller has hung up.

Returning to decision block 1204, if the current detector 416 detects current in the CPE telephone line 103 indicating that the customer premises equipment 106 is off hook and thus has been answered, then the "YES" branch is followed to step 1210.

In step 1210, the interconnection circuit 204 connects the customer premises telephone 106 equipment to wireless communication device 206.

Step 1210 is followed by decision block 1212, in which the current detector 416 determines whether no loop current is present in the CPE telephone line 103 indicating the end of the call. If the current detector 416 detects loop current, indicating that the customer premises telephone 106 is off hook and the call is still in progress, then the "YES" branch is followed back to repeat the query in decision block 1212. This loop repeats until the current detector 416 detects no loop current in the CPE telephone line 103 indicating call completion.

If the current detector 416 detects no loop current in the CPE telephone line 103 indicating that the customer premises telephone 106 is on hook and the call has ended, then the "NO" branch is followed to the step 1214. Step 1214 returns to the line failure analysis subroutine at "Re-entry Process WBTL MAIN" at step 716 in FIG. 7.

Call Forwarding Methods

Figure 13:
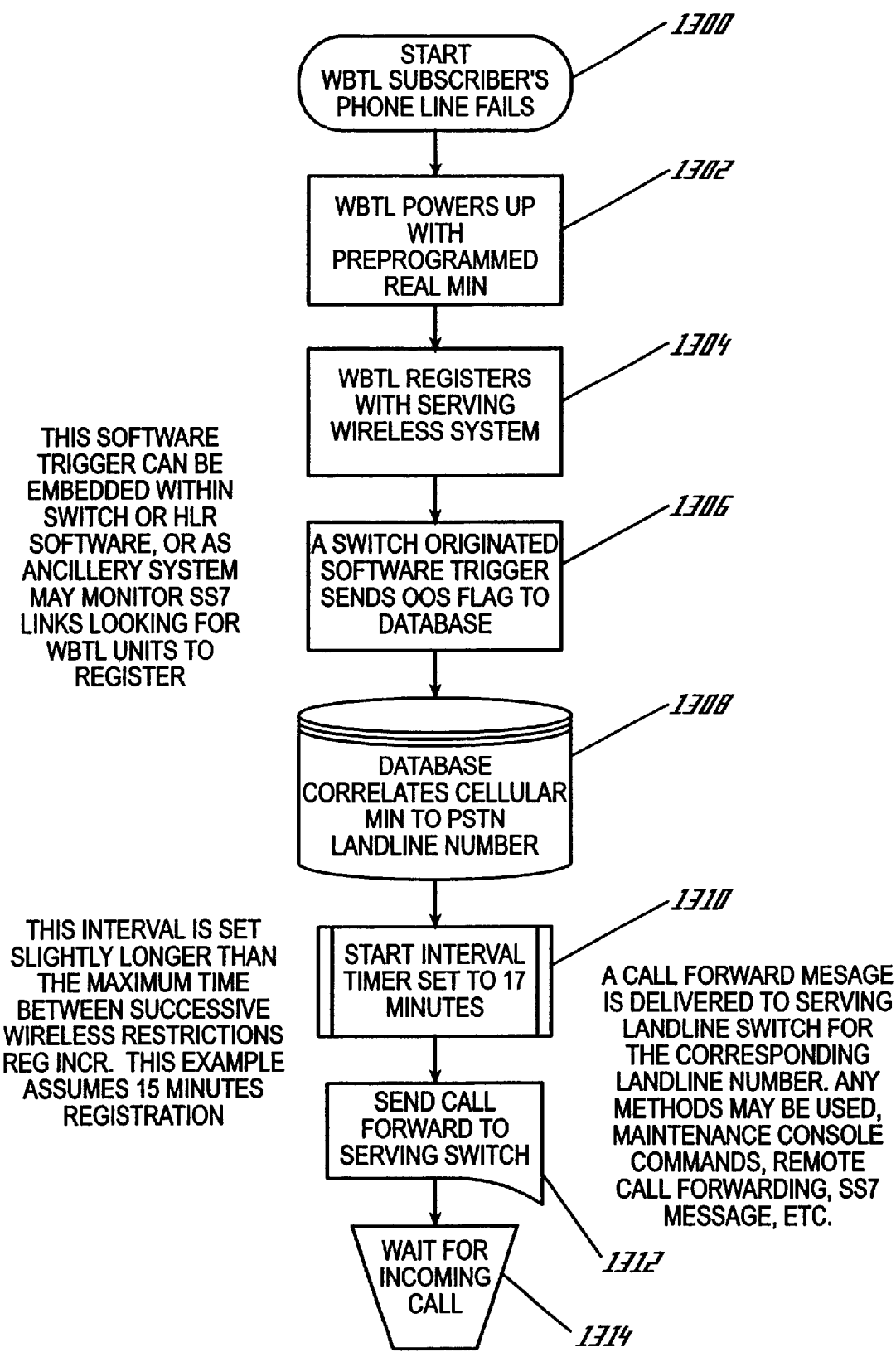
FIG. 13 is a logic flow diagram of a first method of call forwarding support of the backup device shown in FIG. 2.
Figure 14:
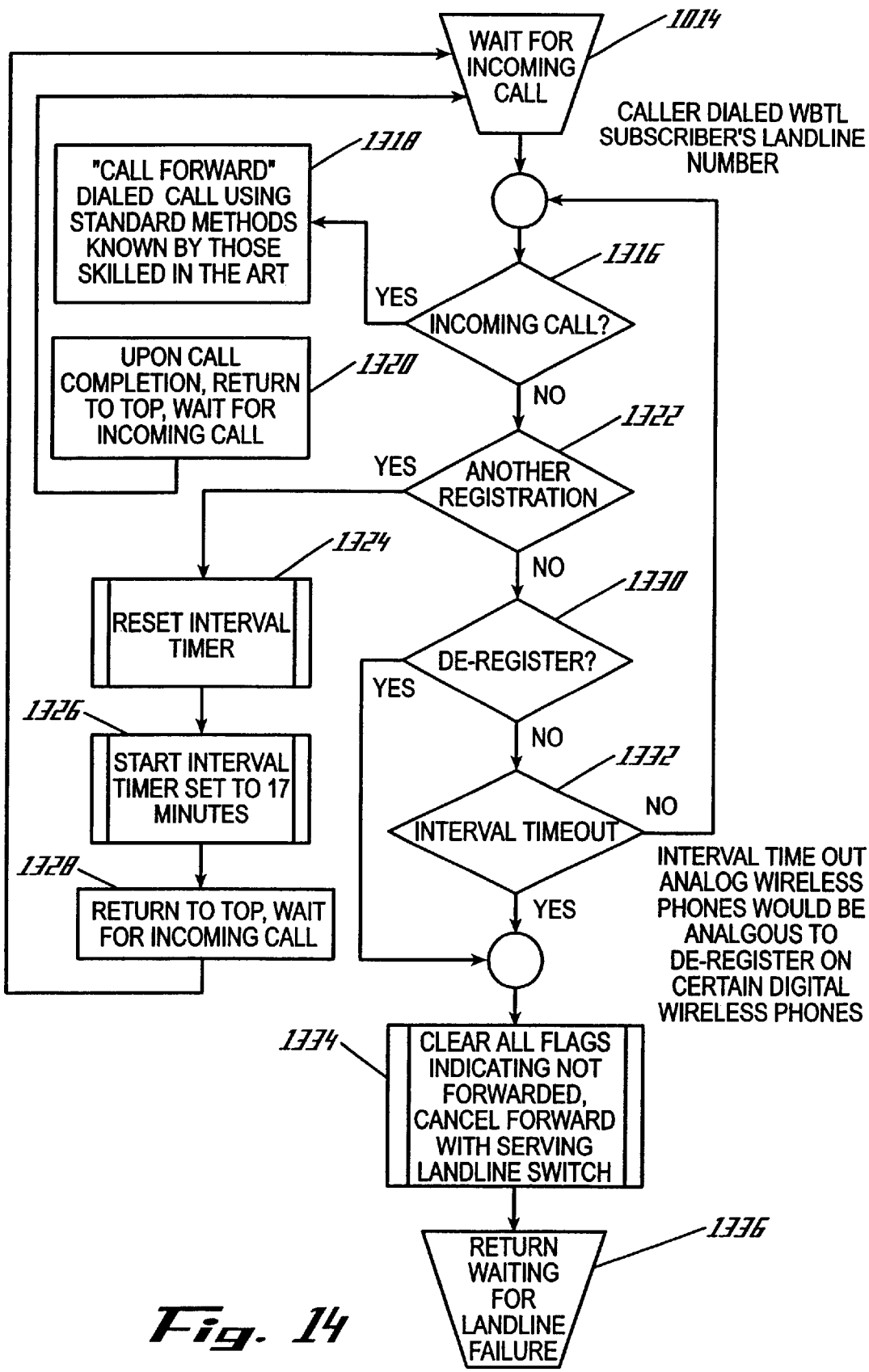
FIG. 14 is a logic flow diagram of a second method of call forwarding in support of the backup device shown in FIG. 2.
Figure 15:
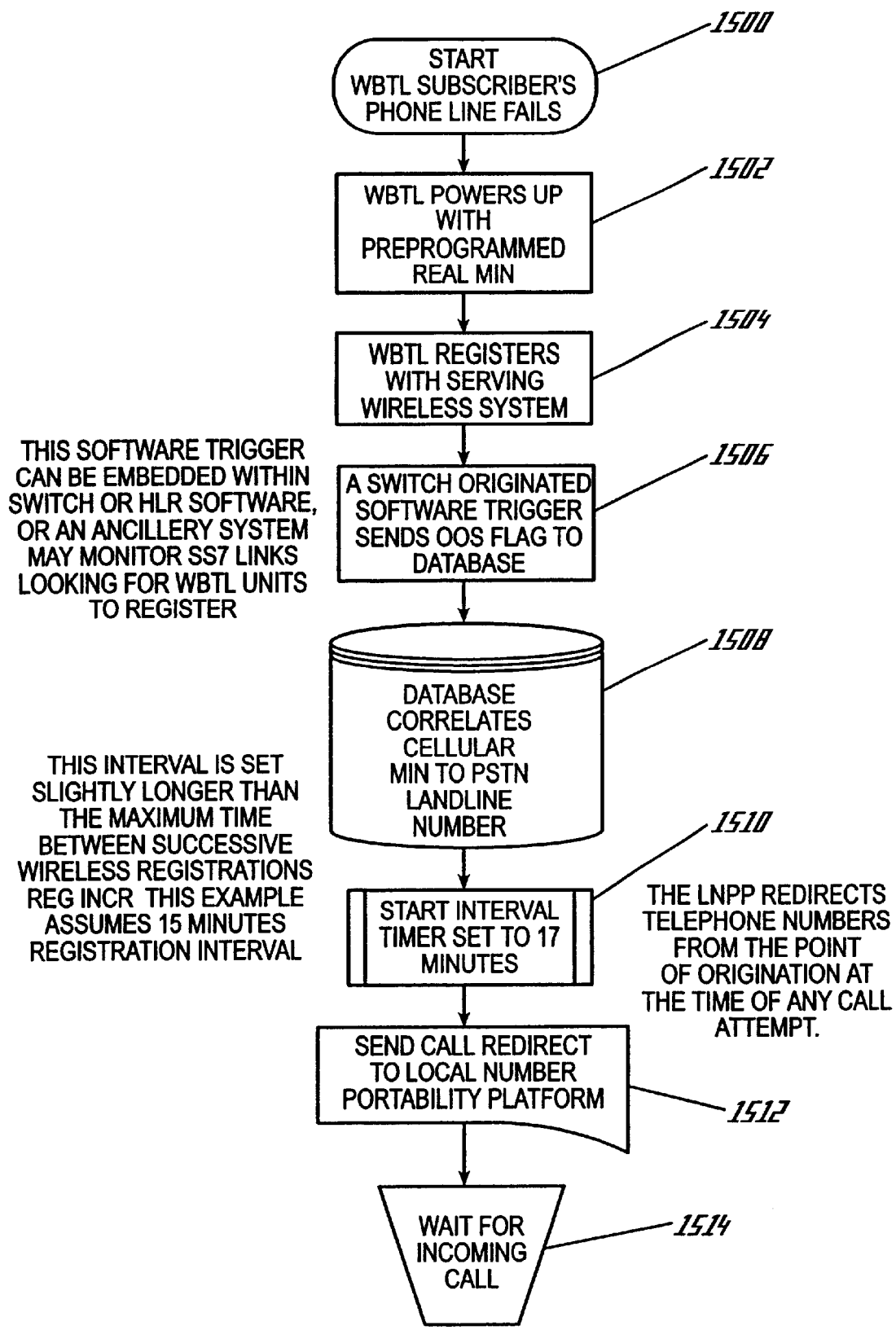
FIG. 15 is a logic flow diagram of a third method of call forwarding in support of the backup device shown in FIG. 2.

The invention utilizes the conventional landline network 100 without requiring significant modification to the backup device 102 device or to the landline network 100. For example, FIGS. 13–14 show a logic block diagram describing the steps taken by a conventional landline network 100 to deliver a call to a backup device 102.

Step 1300 initiates a routine when the subscriber's landline telephone service is interrupted. Step 1300 is followed by step 1302, in which a wireless communication device 206 powers up in the backup device 102. A pre-assigned or pre-programmed mobile identification number (MIN) identifies the wireless communication device 206 in a wireless network. A virtual MIN or a standard MIN can be used to identify the wireless device 206. A virtual MIN cannot normally be dialed in the conventional landline network 100 to reach the wireless device 206 or any other landline telephone. If a caller dials the virtual MIN, the caller may be required to dial an additional local access number before dialing the virtual MIN to place a call to the backup device 102 after the wireless device 206 has been activated.

Alternatively, a standard cellular directory number can be assigned to the wireless device 206, or the directory number assigned to the customer's landline connection 101 can be assigned to the wireless device 206. If a caller dials the standard cellular number, or dials the customer's landline number if the customer's own landline number is assigned to the wireless device, the backup device 102 may receive calls. However, the caller may require knowledge of the assigned directory number, or the caller may be required to dial an additional local access number before dialing the assigned directory number to be able to place a call to the backup device 102 when landline service has been interrupted.

Step 1302 is followed by step 1304, where the wireless device 206 sends a message to a home location register (HLR) 112 internal to or attached to a mobile telephone switching office (MTSO) 110 to register with the wireless network. The wireless device 206 could also send a message to any type of local serving cellular switch to register the wireless communication device 206 with the serving wireless network.

After the wireless communication device 206 completes registration, step 1304 is followed by step 1306 in which a software trigger embedded in the MTSO 110 sends a flag to the HLR 112 database indicating that a backup device 102 has registered with the wireless network. The software trigger initiates an out-of-service (OOS) flag placed with the HLR 112 database indicating that the subscriber's landline 101 service has been interrupted. A software trigger can be embedded in any call redirection device, such as a HLR 112 or a local number portability platform (LNPP) 118. The call redirection device then sends a flag to an internal or attached database, such as an HLR 112 database or a service control point (SCP) 120 database.

In the alternative, an ancillary "snooping" system can monitor SS-7 links looking for backup device 102 devices to register when a backup device 102 sends a registration message to the serving cellular switch. After finding a registration message from a backup device 102 in the landline network 100, the ancillary system can set an OOS flag with a database. The ancillary "snooping system" functions as the equivalent to a software trigger.

Step 1306 is followed by step 1308, in which the HLR 112 database correlates the MIN assigned to the wireless communication device 206 with the directory number assigned to the subscriber's landline connection 101 at the site of service interruption.

Any time a database performs a correlation between a MIN and a landline directory number, a message can be sent to a maintenance center notifying the telephone service provider that landline service has been interrupted at the location served by the landline directory number.

Step 1308 is followed by step 1310, in which an interval timer in the MTSO 110 starts a count of 17 minutes. Any other time interval can be used so long as the time used is longer than the registration interval (REG_INCR) of the wireless network. Setting the interval timer for a time longer than the registration interval ensures that at least part of the wireless network registration interval will be within the time counted by is the interval timer. The registration interval is defined as the time between a successful wireless network registration by a wireless device and the time the wireless network automatically de-registers the wireless device. For example, the registration interval in FIG. 13 starts at a count of 15 minutes, after 15 minutes has elapsed; the wireless device 206 is automatically de-registered.

Step 1310 is followed by step 1312, in which a call forward message is sent to a terminating service switching point (SSP) 116 or the local serving landline switch. The MTSO 110 or the HLR 112 sends a message containing a call redirect flag, a serving system ID, and the MIN of the wireless communication device 206 to the terminating service switching point (SSP) 116. This step implants the MIN into the terminating service switching point (SSP) 116 for use by the switch in redirecting calls made to the landline directory number. The terminating service switching point (SSP) 116 stores this information until the interval timer expires or until the terminating service switching point (SSP) 116 utilizes the stored information for an incoming call.

Step 1312 is followed by step 1314, in which the interval timer continues to run, permitting extra time for an incoming call to arrive at the terminating service switching point (SSP) 116. Step 1314 in FIG. 13 corresponds to step 1314 in FIG. 14.

Turning to FIG. 14, step 1314 is followed by decision block 1316, in which the terminating service switching point (SSP) 116 detects whether an incoming call has been placed to the subscriber's landline directory number. If an incoming call is detected, the "YES" branch is followed to step 1318.

In step 1318, the terminating service switching point (SSP) 116 receives the incoming call, and the terminating service switching point (SSP) 116 uses the MIN to redirect the call to the MTSO 110. The terminating service switching point (SSP) 116 routes the call to the cellular serving switch, and the terminating service switching point (SSP) 116 routes the call to the MTSO 110 for transmission over a radio frequency to the backup device 102. Any other conventional call forwarding method can be used in step 1318 so long as the MIN is used to redirect the incoming call to the wireless communication device 206 of the backup device 102.

Step 1318 is followed by step 1320, in which the call is completed and a return to step 1314 waits for another incoming call.

Returning to decision block 1316, if the terminating service switching point (SSP) 116 does not detect an incoming call to the subscriber's landline directory number, then the "NO" branch is followed to decision block 1322.

Decision block 1316 is followed by decision block 1322, in which the MTSO 110 detects whether the wireless communication device 206 has sent another registration message to the MTSO 110 to register with the wireless network. If a successful registration has been made with the wireless network, then the "YES" branch is followed to step 1324.

In step 1324, the MTSO 110 resets the interval timer. Step 1324 is followed by step 1326, in which the interval timer starts a count down from 17 minutes or from another set time. Step 1326 is followed by step 1328, returning to step 1314 waiting for an incoming call.

Returning to decision block 1322, if the MTSO 110 does not detect another registration or the registration failed for any reason, then the wireless communication device 206 will no longer be currently registered on the wireless network and the "NO" branch will be followed to decision block 1330.

At decision block 1330, the MTSO 110 detects whether the wireless communication device 206 de-registered from the wireless network. If the wireless communication device 206 has not de-registered from the wireless network, then the "NO" branch is followed to decision block 1332. At decision block 1332, the MTSO determines if an interval time out has occurred. If an interval time out has not occurred then the "NO" branch is followed to decision block 1316. At decision block 1316, the MTSO 110 again detects whether an incoming call to the subscriber's landline directory number has been made. This loop continues until the MTSO 110 detects a new registration of the wireless device 206 or until the wireless device 206 de-registers from the wireless network.

Returning to decision block 1332, if an interval time out has occurred, the "YES" branch is followed to step 1334. For some digital wireless devices and most analog wireless communication devices that do not perform a de-registration from the wireless network, the interval time out performs the equivalent function as a de-registration.

Returning to decision block 1330, if the wireless communication device 206 has de-registered from the wireless network, then the "YES" branch is followed to step 1334. A de-registration is typically performed by a digital wireless communication device. Some digital wireless devices and most analog wireless communication devices do not perform a de-registration from the wireless network.

Decision block 1330 is followed by step 1334, in which the MTSO 110 restores the landline directory number in the terminating service switching point (SSP) 116, removing all flags and pointers that had previously been set within the MTSO 110 and the HLR 112 database.

Step 1334 is followed by step 1336, returning to start block 1300 in FIG. 13 waiting for a subscriber's landline connection to fail.

Future telecommunication equipment upgrades and technological advances in the landline network are anticipated. Several methods of delivering calls through modified landline network components are described as follows. For example, in a landline network 100 using a local number portability platform (LNPP) 118, the LNPP 118 functions as a call redirection device. FIGS. 15–16, 17–18, and 19–20 describe three different logic block diagrams illustrating the steps taken by a landline network utilizing a modified LNPP to deliver a call to a backup device 102.

In start block 1500, the routine begins when the subscriber's landline telephone service is interrupted. Step 1500 is followed by step 1502, in which the backup device 102 powers up a wireless communication device 206. A pre-assigned or preprogrammed real mobile identification number (MIN) identifies the wireless communication device 206 in a wireless network.

Step 1502 is followed by step 1504, in which the backup device 102 sends a message to a mobile telephone switching office (MTSO) 110 or an internal or attached home location register (HLR) 112, or any other local serving cellular switch, to register the wireless communication device 206 with the serving wireless network.

Step 1504 is followed by step 1506, in which a software trigger embedded in the MTSO 110 or the HLR 112 software activates a database flag. The software trigger initiates a call forward record or an out-of-service (OOS) flag placed with the MTSO 110 or the HLR 112, indicating that the subscriber's landline service has been interrupted.

Step 1506 is followed by step 1508, in which a database associated with the MTSO 110 or the HLR 112 correlates the MIN assigned to the wireless communication device 206 with the directory number assigned to the landline connection 101 the site of service interruption.

Step 1508 is followed by step 1510, in which an interval timer in the MTSO 110 starts a count of 17 minutes, or any other time longer than the registration interval (REG_INCR) of the wireless network. In this example, the registration interval starts at a count of 15 minutes.

Step 1510 is followed by step 1512, in which the MTSO 110 sends a call redirect message to the LNPP 118. The call redirect message contains a call redirect flag, a serving system ID, and the real MIN of the wireless communication device 206. The LNPP 118 redirects calls to directory numbers from the point of origination at the time of the call attempt. The LNPP 118 stores the call redirect flag, the serving system ID, and the real MIN until the interval timer expires or until the landline directory number is restored.

Step 1512 is followed by step 1514, in which the interval timer continues to run, waiting for an incoming call to the originating service switching point (SSP) 114. Step 1514 corresponds to step 1514 in FIG. 16.

Figure 16:
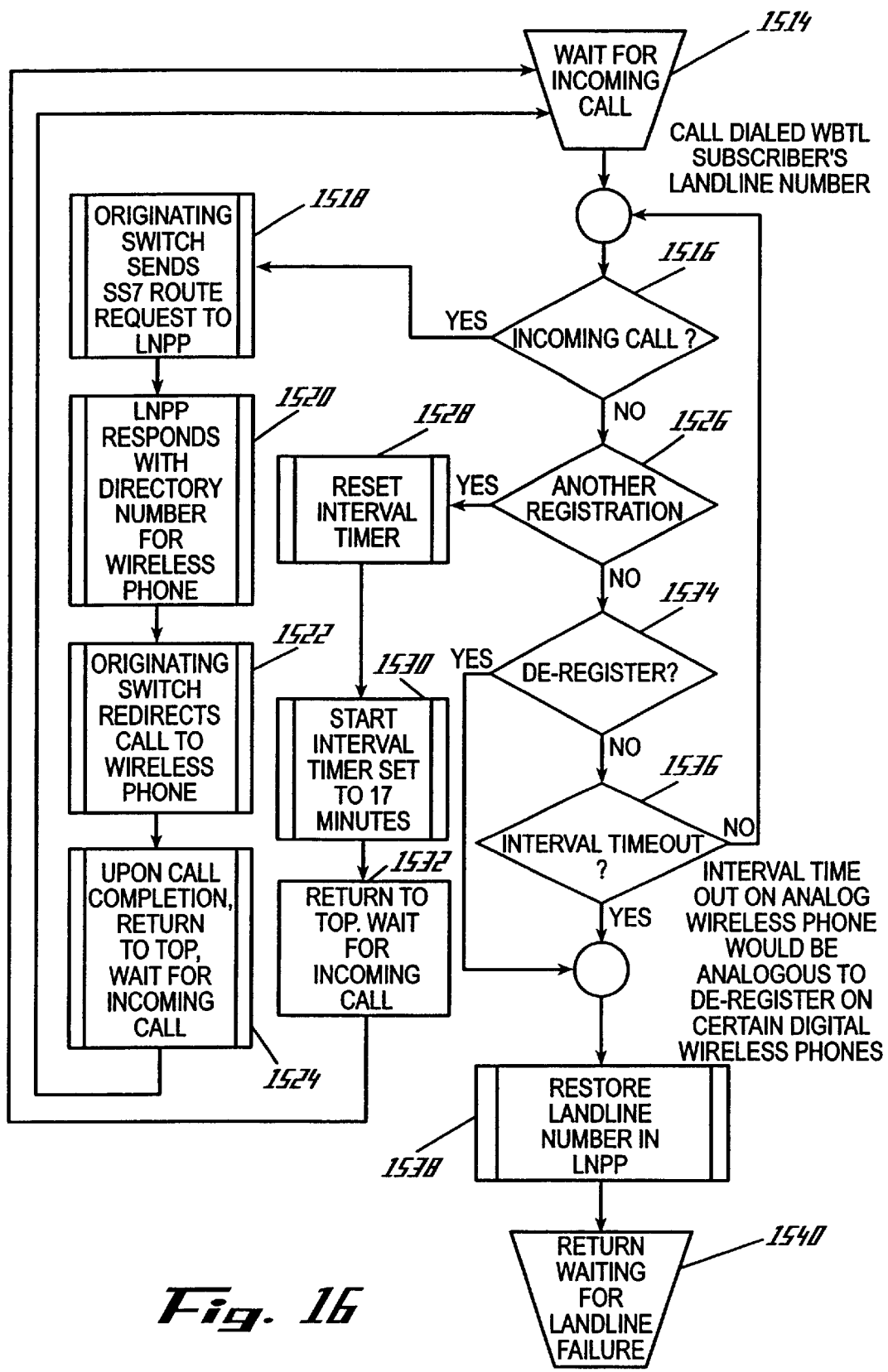
FIG. 16 is a logic flow diagram of a fourth method of call forwarding in support of a backup device.

Turning to FIG. 16, step 1514 is followed by decision block 1516, in which the originating service switching point (SSP) 114 detects whether an incoming call has been placed to the subscriber's landline directory number. If an incoming call is detected, the "YES" branch is followed to step 1518.

In step 1518, the originating service switching point (SSP) 114 receives the incoming call, and sends a SS-7 route request to the LNPP 118.

Step 1518 is followed by step 1520, in which the LNPP 118 responds to the SS-7 route request by sending a message with the MIN for the wireless communication device 206 instead of the landline directory number.

Step 1520 is followed by step 1522, in which the originating service switching point (SSP) 114 uses the received message with the real MIN to redirect the call to the MTSO 110. The originating service switching point (SSP) 114 routes the call to the MTSO 110 for transmission over a radio frequency to the backup device 102.

Step 1522 is followed by step 1524, in which the MTSO 110 waits for call completion, and then the routine returns to step 1514 to wait for an incoming call.

Returning to decision block 1516, if the originating service switching point (SSP) 114 does not detect an incoming call to the subscriber's landline directory number, then the "NO" branch is followed to decision block 1526.

At decision block 1526, the MTSO 110 detects whether the wireless communication device 206 has sent another registration message to register with the wireless network. If a successful registration has been made, then the "YES" branch is followed to step 1528.

In step 1528, the MTSO 110 resets the interval timer. Step 1528 is followed by step 1530, in which the interval timer starts a count down from 17 minutes or from another set time. Step 1530 is followed by step 1532, returning to the step 1314 to wait for an incoming call.

Returning to decision block 1526, if the MTSO 110 does not detect another registration or the registration failed for any reason, then the wireless communication device 206 will no longer be currently registered on the wireless network and the "NO" branch will be followed to decision block 1534.

At decision block 1534, the MTSO 110 detects whether the wireless communication device 206 de-registered from the wireless network. If the wireless communication device 206 has de-registered from the wireless network, then the "YES" branch is followed to step 1538. A de-registration is typically performed by a digital wireless communication device. Some digital wireless devices and most analog wireless communication devices do not perform a de-registration from the wireless network.

If the wireless communication device has not de-registered from the wireless network, then the "NO" branch is followed to decision block 1536. At decision block 1536, the MTSO 110 determines whether an interval time out has occurred. If an interval time out has not occurred then the "NO" branch is followed back to the decision block 1516. At decision block 1516, the MTSO 110 again detects whether an incoming call to the subscriber's landline directory number has been made. This loop continues until the MTSO 110 detects a new registration of the wireless device 206 or until the wireless device 206 de-registers from the wireless network.

Returning to decision block 1536, if an interval time out has occurred, then the "YES" branch is followed to step 1538. For the digital wireless devices and most analog wireless communication devices that do not perform a de-registration from the wireless network, the interval time out performs the equivalent function as a de-registration.

In step 1538, the MTSO 110 restores the landline directory number in the LNPP 118, by removing all flags and pointers that had previously been set within the originating service switching point (SSP) 114. Step 1538 is followed by step 1540, returning to the start block 1500 in FIG. 15 waiting for a subscriber's landline connection 101 to fail.

Figure 17:
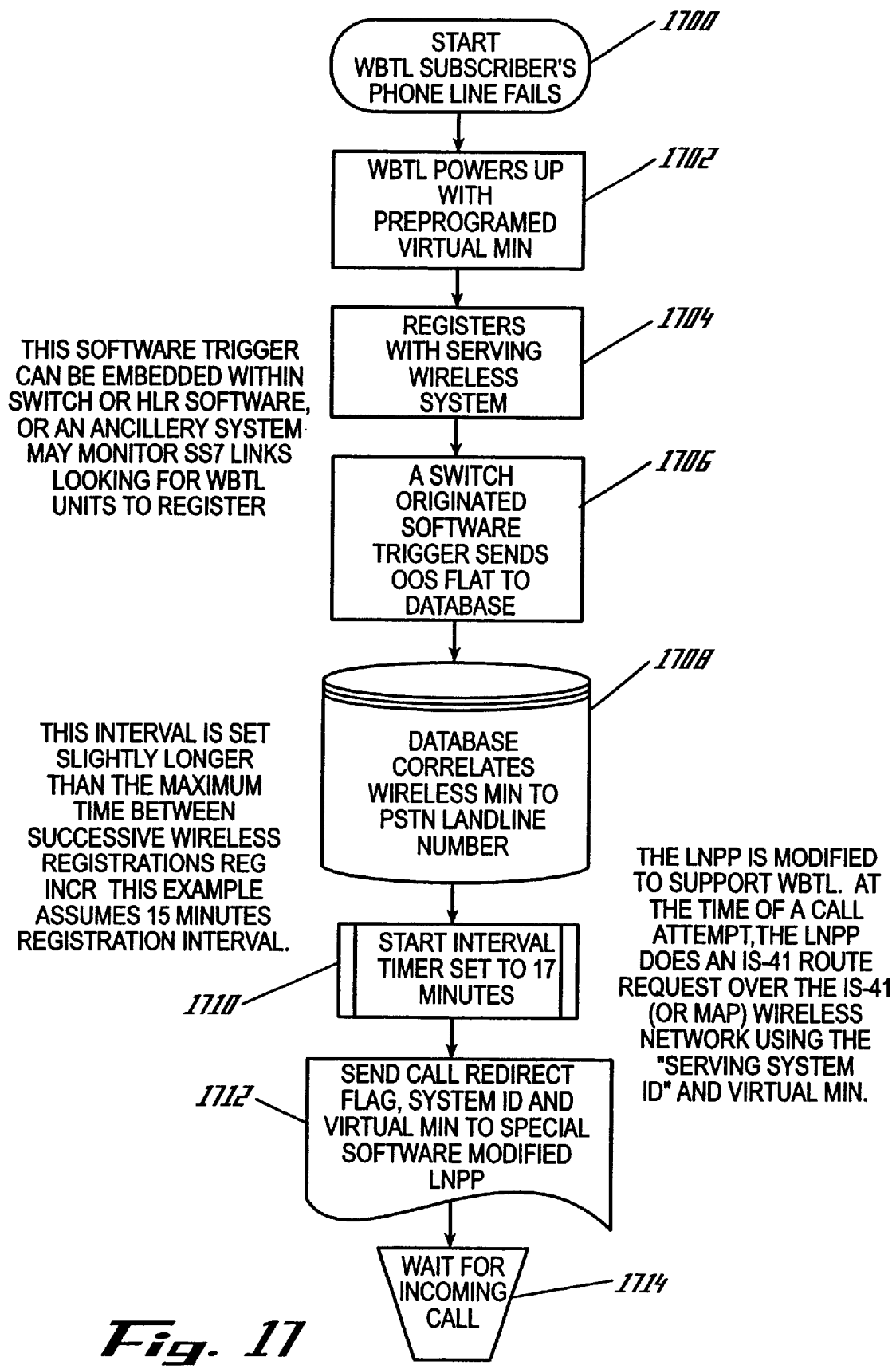
FIG. 17 is a logic flow diagram of a fifth method of call forwarding in support of a backup device.
Figure 18:
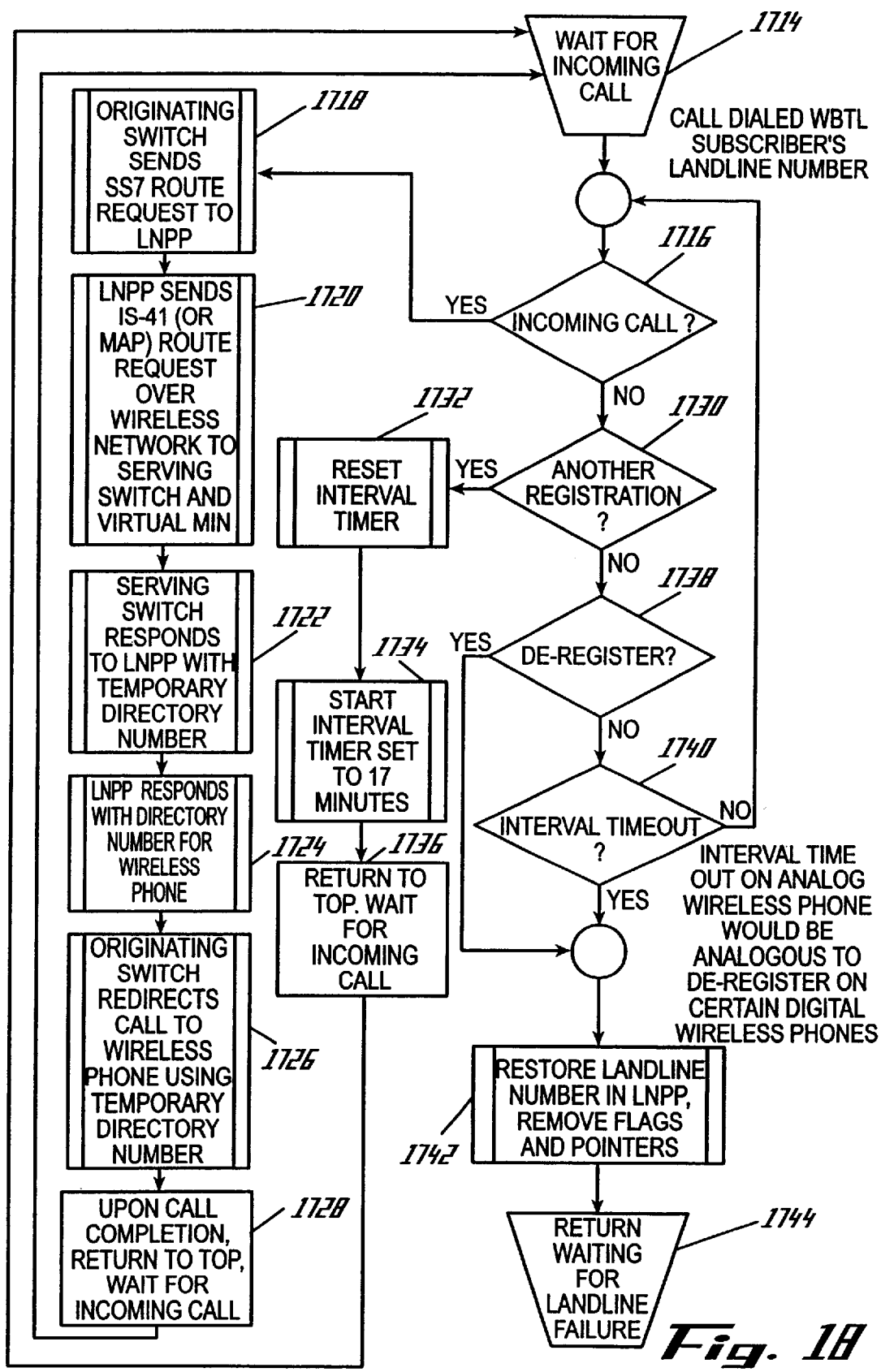
FIG. 18 is a logic flow diagram of a sixth method of call forwarding in support of a backup device.

FIGS. 17–18 illustrate a preferred embodiment of the invention. In start block 1700, the routine begins when the subscriber's landline telephone service is interrupted. Step 1700 is followed by step 1702, in which the backup device 102 powers up a wireless communication device 206. A pre-assigned or preprogrammed virtual mobile identification number (MIN) identifies the wireless communication device 206 in a wireless network.

Step 1702 is followed by step 1704, in which the wireless communication device 206 sends a message to a MTSO 110 or an attached HLR 112 to register the wireless device 206 with the serving wireless network.

Step 1704 is followed by step 1706, in which a software trigger embedded in the MTSO 110 or the HLR 112 software activates a database flag. The trigger initiates a call forward record or an out-of-service (OOS) flag placed with the local MTSO 110 or the HLR 112, indicating that the backup device 102 subscriber's landline service has been interrupted.

Step 1706 is followed by step 1708, in which a database associated with the MTSO 110 or the HLR 112 correlates the virtual MIN assigned to the wireless communication device 206 with the landline directory number at the site of service interruption.

Step 1708 is followed by step 1710, an interval timer at the MTSO 110 starts a count of 17 minutes, or any other time longer than the registration interval (REG_INCR) of the wireless network. In this example, the registration interval starts at a count of 15 minutes.

Step 1710 is followed by step 1712, in which the MTSO 110 sends a call redirect message to a modified LNPP 118. The modified LNPP 118 has been modified to support the backup device 102. The call redirect message contains a call redirect flag, a serving system ID, and the virtual MIN of the wireless communication device 206. The LNPP 118 redirects calls to directory numbers from the point of origination at the time of the call attempt. The LNPP 118 stores the call redirect flag, the serving system ID, and the virtual MIN until the interval timer expires or until the landline directory number is restored.

Step 1712 is followed by step 1714, in which the interval timer continues to run waiting for an incoming call to an originating service switching point (SSP) 114. Step 1714 corresponds to step 1714 in FIG. 18.

Turning to FIG. 18, step 1714 is followed by decision block 1716, in which the originating service switching point (SSP) 114 detects whether an incoming call has been placed to the subscriber's landline directory number. If an incoming call is detected, the "YES" branch is followed to step 1718.

In step 1718, the originating service switching point (SSP) 114 receives the incoming call, and the originating service switching point (SSP) 114 sends a SS-7 route request to the LNPP 118.

Step 1718 is followed by step 1720, in which the LNPP 118 responds to the SS-7 route request by sending an IS-41 route request or MAP route request over the North American wireless network to the MTSO 110 identified by the serving system ID. The route request contains the serving system ID and the virtual MIN.

Step 1720 is followed by step 1722, in which the MTSO 110 uses the received IS-41 route request with the serving system ID and the virtual MIN to respond to the LNPP 118 with a temporary directory number (TLDN) for the wireless communication device 206.

Step 1722 is followed by step 1724, in which the LNPP 118 responds to the route request from the originating service switching point (SSP) 114 by sending the TLDN for the wireless communication device 206 to the originating service switching point (SSP) 114.

Step 1724 is followed by step 1726, in which the originating service switching point (SSP) 114 redirects the call by routing the call to the MTSO 110, and the MTSO 110 sends the call over a radio frequency to the backup device 102. At the instant that the wireless device 206 answers the incoming call, the MTSO 110 releases the TLDN back for re-use or re-assignment.

Step 1726 is followed by step 1728, in which the MTSO 110 detects call completion. Step 1728 returns to step 1714 to wait for another incoming call to the subscriber's landline directory number.

Returning to decision block 1716, if the originating service switching point (SSP) 114 does not detect an incoming call to the subscriber's landline directory number, then the "NO" branch is followed to decision block 1730.

At decision block 1730, the MTSO 110 detects whether the wireless communication device 206 has sent another registration message to register with the wireless network. If a successful registration has been made, then the "YES" branch is followed to step 1732.

In step 1732, the MTSO 110 resets the interval timer. Step 1732 is followed by step 1734, in which the interval timer starts a count down from 17 minutes or from another set time. Step 1734 is followed by step 1736, returning to step 1714 waiting for another incoming call to the originating service switching point (SSP) 114.

Returning to decision block 1730, if the MTSO 110 does not detect another registration or the registration failed for any reason, then the wireless communication device 206 will no longer be currently registered on the wireless network and the "NO" branch will be followed to decision block 1738.

At decision block 1738, the MTSO 110 detects whether the wireless communication device 206 de-registered from the wireless network. If the wireless communication device 206 has de-registered from the wireless network, then the "YES" branch is followed to step 1742. A de-registration is typically performed by a digital wireless communication device. Some digital wireless devices and most analog wireless communication devices do not perform a de-registration from the wireless network.

If the wireless communication device 206 has not de-registered from the wireless network, then the "NO" branch is followed to decision block 1740. At decision block 1740, the MTSO 110 determines whether an interval time out has occurred. If the MTSO 110 determines that an interval time out has not occurred, then the "NO" branch is followed back to decision block 1716. At decision block 1716, the originating service switching point (SSP) 114 again determines whether an incoming call to the subscriber's landline directory number has been received. This loop continues until an incoming call is received at the originating service switching point (SSP) 114, until the wireless device 206 registers again, until the wireless device 206 de-registers with the wireless network, or until the MTSO 110 detects an interval time out.

Returning to decision block 1740, if an interval time out has occurred, the "YES" branch is followed to step 1742. For some digital wireless devices and most analog wireless communication devices that do not perform a de-registration from the wireless network, the interval time out performs the equivalent function as a de-registration.

In step 1742, the MTSO 110 restores the landline directory number in the LNPP 118 by removing all flags and pointers that had previously been set within the MTSO 110 or connected HLR 112 database. Step 1742 is followed by step 1744, returning to the start block 1700 in FIG. 17 waiting for a subscriber's landline connection to fail.

Figure 19:
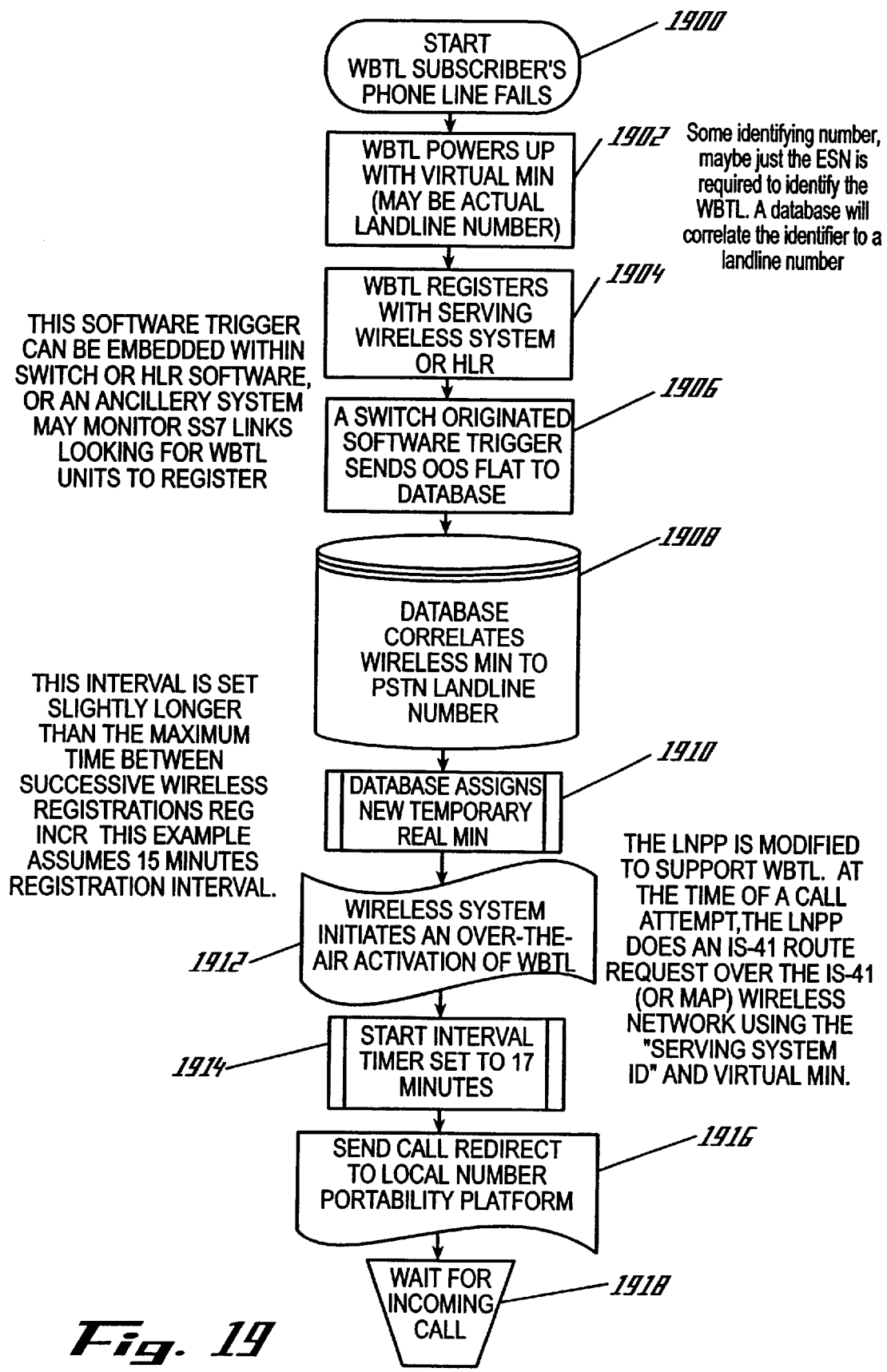
FIG. 19 is a logic flow diagram of a seventh method of call forwarding in support of a backup device.
Figure 20:
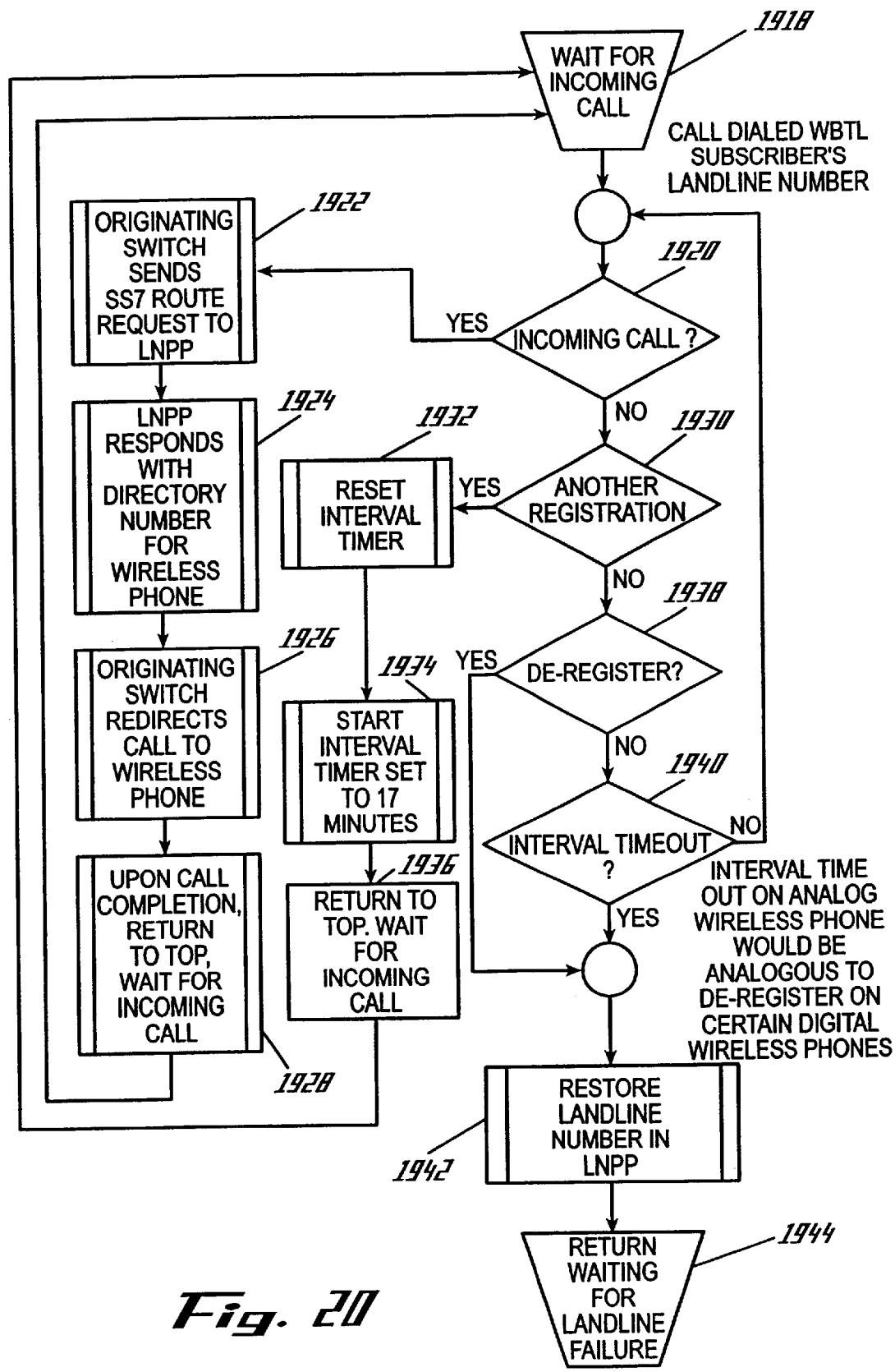
FIG. 20 is a logic flow diagram of an eighth method of call forwarding in support of a backup device.

FIGS. 19–20 illustrate another embodiment of a call forwarding routine. In this embodiment, a block of temporary line directory numbers (TLDN) are reserved within the North American Numbering Plan (NANP). In start block 1900, the routine begins when the subscriber's landline telephone service is interrupted. Step 1900 is followed by step 1902, in which the backup device 102 powers up a wireless communication device 206. A pre-assigned or pre-programmed virtual mobile identification number (MIN) identifies the wireless communication device 206 in a wireless network. When the wireless communication device 206 is powered down, the virtual MIN will be restored when the wireless device is subsequently powered on, and any temporary MIN assigned to the wireless device 206 will be cleared.

Step 1902 is followed by step 1904, in which the wireless communication device 206 sends a message to a MTSO 110 or an attached HLR 112 to register the wireless device 206 with the serving wireless network.

Step 1904 is followed by step 1906, in which a software trigger embedded in the MTSO 110 or the HLR 112 software activates a database flag. The trigger initiates a call forward record or an out-of-service (OOS) flag placed with the local MTSO 110 or the HLR 112, indicating that the backup device 102 subscriber's landline service has been interrupted.

Step 1906 is followed by step 1908, in which a database associated with the MTSO 110 or the HLR 112 correlates the virtual MIN assigned to the wireless communication device 206 with the landline directory number at the site of service interruption.

Step 1908 is followed by step 1910, in which the database assigns a new temporary real MIN or temporary directory number to the wireless device 206.

Step 1910 is followed by step 1912, in which the wireless network initiates an over-the-air activation of the backup device 102. The backup device is activated by the MTSO by sending a message containing a real directory number from a reserved block of directory numbers. Conventional over-the-air activation methods are used to program the wireless communication device 206 in the backup device 102 with a real directory number from a reserved block of temporary directory numbers. The reserved numbers will only be assigned to a backup device when the backup device is operating. Variations of directory number assignment program a standard cellular directory number into the wireless device via over-the-air activation methods.

Step 1912 is followed by step 1914, in which an interval timer at the MTSO 110 starts a count of 17 minutes, or any other time longer than the registration interval (REG_INCR) of the wireless network. In this example, the registration interval starts at a count of 15 minutes.

Step 1914 is followed by step 1916, in which the MTSO 110 sends a call redirect message to a LNPP 118. The call redirect message contains a call redirect flag, a serving system ID, and the temporary real MIN of the wireless communication device 206. The LNPP 118 redirects calls to directory numbers from the point of origination at the time of the call attempt. The LNPP 118 stores the call redirect flag, the serving system ID, and the temporary real MIN until the interval timer expires or until the landline directory number is restored. Variations of this method utilize any type of remote call forwarding platform updated with a temporary real MIN or a standard directory number.

Step 1916 is followed by step 1918, in which the interval timer continues to run waiting for an incoming call to an originating service switching point (SSP) 114. Step 1918 corresponds to step 1918 in FIG. 18.

Turning to FIG. 20, step 1918 is followed by decision block 1920, in which the originating service switching point (SSP) 114 detects whether an incoming call has been placed to the subscriber's landline directory number. If an incoming call is detected, the "YES" branch is followed to step 1922.

In step 1922, the originating service switching point (SSP) 114 sends a SS-7 route request to the LNPP 118.

Step 1922 is followed by step 1924, in which the LNPP 118 responds to the SS-7 route request from the originating service switching point (SSP) 114 by sending a return message containing the temporary real MIN assigned to the wireless communication device 206 back to the originating service switching point (SSP) 114.

Step 1924 is followed by step 1926, in which the originating service switching point (SSP) 114 redirects the call by routing the call to the MTSO 110, and the MTSO 110 sends the call over a radio frequency to the backup device 102.

Step 1926 is followed by step 1928, in which the MTSO 110 detects call completion. Step 1928 returns to step 1918 to wait for another incoming call to the subscriber's landline directory number.

Returning to decision block 1920, if the originating service switching point (SSP) 114 does not detect an incoming call to the subscriber's landline directory number, then the "NO" branch is followed to decision block 1930.

At decision block 1930, the MTSO 110 detects whether the wireless communication device 206 has sent another registration message to register with the wireless network. If a successful registration has been made, then the "YES" branch is followed to step 1932.

In step 1932, the MTSO 110 resets the interval timer. Step 1932 is followed by step 1934, in which the interval timer starts a count down from 17 minutes or from another set time. Step 1934 is followed by step 1936, returning to step 1918 waiting for another incoming call to the originating service switching point (SSP) 114.

Returning to decision block 1930, if the MTSO 110 does not detect another registration or the registration failed for any reason, then the wireless communication device 206 will no longer be currently registered on the wireless network and the "NO" branch will be followed to decision block 1940.

At decision block 1938, the MTSO 110 detects whether the wireless communication device 206 de-registered from the wireless network. If the wireless communication device 206 has de-registered from the wireless network, then the "YES" branch is followed to step 1942. A de-registration is typically performed by a digital wireless communication device. Some digital wireless devices and most analog wireless communication devices do not perform a de-registration from the wireless network.

If the wireless communication device 206 has not de-registered from the wireless network, then the "NO" branch is followed to decision block 1940. At decision block 1940, the MTSO 110 determines whether an interval time out has occurred. If the MTSO 110 determines that an interval time out has not occurred, then the "NO" branch is followed back to decision block 1920. At decision block 1920, the originating service switching point (SSP) 114 again determines whether an incoming call to the subscriber's landline directory number has been received. This loop continues until an incoming call is received at the originating service switching point (SSP) 114, until the wireless device 206 registers again, until the wireless device 206 de-registers with the wireless network, or until the MTSO 110 detects an interval time out.

Returning to decision block 1940, if an interval time out has occurred, the "YES" branch is followed to step 1942. For some digital wireless devices and most analog wireless communication devices that do not perform a de-registration from the wireless network, the interval time out performs the equivalent function as a de-registration.

In step 1942, the MTSO 110 restores the landline directory number in the LNPP 118 by removing all flags and pointers that had previously been set within the MTSO 110 or connected HLR 112 database. Furthermore, upon either de-registration of the wireless device 206 or upon an interval time out, the temporary real MIN assigned to the wireless device 206 is released, and the virtual MIN assigned to the wireless device 206 is restored. Step 1942 is followed by step 1944, returning to the start block 1900 in FIG. 19 waiting for a subscriber's landline connection to fail.

In view of the foregoing, it will be appreciated that the invention provides an improved backup device for landline telephone equipment. It will be understood that the preferred embodiment has been disclosed by way of example, and that other modifications may occur to those skilled in the art without departing from the scope and spirit of the appended claims.

The invention claimed is:

1. A wireless backup telephone device for providing emergency backup telephone service to customer premises telephone equipment connected through a landline to a telephone network, the device operable for:

detecting an interruption of telephone service provided by the landline to the customer premises equipment;

in response to the detection of said interruption, powering a wireless communication device operable for communicating with a wireless network;

switching the customer premises equipment to be functionally connected to the wireless communication device;

transmitting a message instructing a telephone call redirection device to forward telephone calls directed to a directory number assigned to the customer premises telephone equipment to a directory number assigned to the wireless communication device, wherein the telephone call redirection device comprises a database configured for, receiving a message with a directory number query, and assigning a directory number to the wireless communication device based upon the query; and providing emergency backup telephone service to the customer premises telephone equipment through the wireless communication device.

2. The wireless backup telephone device of claim 1, further comprising a voltage generator, a ring generator, and a dial tone generator for providing emergency backup telephone service to the customer premises telephone equipment.

3. The wireless backup telephone device of claim 1, further operable for:

automatically detecting resumption of telephone service provided by the landline to the customer premises equipment while the customer premises equipment is functionally connected to the wireless communication device;

switching the customer premises equipment to be disconnected from the wireless communication device; and powering down the wireless communication device.

4. The wireless backup telephone device of claim 3, further operable for:
  automatically transmitting a message instructing the telephone call redirection device to unforward telephone calls to the directory number assigned to the wireless communication device to the directory number assigned to the customer premises telephone equipment.

5. The wireless backup telephone device of claim 3, further operable for detecting resumption of telephone service provided by the landline to the customer premises telephone equipment by:
  detecting a dial tone on the landline;
  detecting a busy tone on the landline; or
  detecting a ring signal on the landline.

6. The wireless backup telephone device of claim 1, further operable for:
  requesting a temporary line directory number for use while providing the emergency backup telephone service to the customer premises telephone equipment;
  receiving the temporary line directory number; and
  transmitting the temporary line directory number to the telephone call redirection device.

7. The wireless backup telephone device of claim 1, further operable for:
  in response to powering on the wireless communication device, activating a telephone backup indication device in an alarm system located in the customer premises.

8. The wireless backup telephone device of claim 1, further operable for:
  in response to powering down the wireless communication device, deactivating a telephone backup indication device in an alarm system located in the customer premises.

9. The wireless backup telephone device of claim 1, further operable for:
  in response to powering on the wireless communication device, informing a maintenance center of the interruption of the landline telephone service.

10. The wireless backup telephone device of claim 1, further operable for:
  charging a battery within the wireless communication device.

11. The wireless backup telephone device of claim 1, wherein the wireless communication device is removable from a socket attached to the wireless backup telephone device.

12. The wireless backup telephone device of claim 1, further operable for detecting the interruption of telephone service provided by the landline to the customer premises telephone equipment by detecting a loss of voltage in the landline.

13. The wireless backup telephone device of claim 1, further operable for detecting the interruption of telephone service provided by the landline to the customer premises telephone equipment by detecting a loss of dial tone on the landline.

14. The wireless backup telephone device of claim 1, further operable for detecting the interruption of telephone service provided by the landline to the customer premises telephone equipment by detecting a loss of ring voltage in the landline.

15. The wireless backup telephone device of claim 1, further operable for detecting the interruption of telephone service provided by the landline to the customer premises telephone equipment by detecting a loss of current in the landline.

16. The wireless backup telephone device of claim 1, further operable for detecting the interruption of telephone service provided by the landline to the customer premises telephone equipment by monitoring a telephone call taking place on the landline and detecting a lack of progress in the telephone call.

17. The method of claim 1, wherein the database is a common channel signaling database.

18. The method of claim 1, wherein the database is an ancillary database configured to communicate with a network.

19. The method of claim 1, wherein the database is a local number portability platform database in communication with at least one local number portability platform.

20. The method of claim 1, wherein the database is a modified local number portability platform database configured with advanced intelligent network programming.

21. A premises alarm system comprising a wireless backup telephone device for providing emergency backup telephone service to customer premises telephone equipment connected through a landline to a telephone network, the alarm system operable for:
  detecting an interruption of telephone service provided by the landline to the customer premises telephone equipment;
  in response to the detection of said interruption,
    powering a wireless communication device operable for communicating with a wireless network;
    switching the customer premises telephone equipment to be functionally connected to the wireless communication device;
    transmitting a message instructing a telephone call redirection device to forward telephone calls directed to a directory number assigned to the customer premises telephone equipment to a directory number assigned to the wireless communication device, wherein the telephone call redirection device comprises a database configured for,
      receiving a message with a directory number query, and
      assigning a directory number to the wireless communication device based upon the query;
    providing emergency backup telephone service to the customer premises telephone equipment through the wireless communication device; and
    notifying the customer of the landline interruption by activating a telephone backup indication device in the premises alarm system located in the customer premises.

22. The premises alarm system of claim 21, further comprising a voltage generator, a ring generator, and a dial tone generator for providing emergency backup telephone service to the customer premises telephone equipment.

23. The premises alarm system of claim 21, further operable for:
  automatically detecting resumption of telephone service provided by the landline to the customer premises equipment;
  switching the customer premises equipment to be disconnected to the wireless communication device;
  powering down the wireless communication device; and
  notifying the customer of the resumption in landline telephone service by deactivating the telephone backup indication device in the alarm system located in the customer premises.

24. The premises alarm system of claim 23, further operable for:

automatically transmitting a message instructing a telephone call redirection device to unforward telephone calls to the directory number assigned to the wireless communication device to the directory number assigned to the customer premises telephone equipment.

25. The premises alarm system of claim 21, further operable for:

requesting a temporary line directory number for use while providing the emergency backup telephone service to the customer premises telephone equipment;

receiving the temporary line directory number; and transmitting the temporary line directory number to the telephone call redirection device.

26. The system of claim 21, wherein the database is a common channel signaling database.

27. The system of claim 21, wherein the database is an ancillary database configured to communicate with a network.

28. The system of claim 21, wherein the database is a local number portability platform database in communication with at least one local number portability platform.

29. The system of claim 21, wherein the database is a modified local number portability platform database configured with advanced intelligent network programming.

* * * * *